US012639149B2

(12) United States Patent
Jordan et al.

(10) Patent No.: US 12,639,149 B2
(45) Date of Patent: May 26, 2026

(54) FAILURE RECOVERY IN A DISTRIBUTED COARSE GRAINED RECONFIGURABLE ARCHITECTURE

(71) Applicant: SambaNova Systems, Inc., Palo Alto, CA (US)

(72) Inventors: Paul Jordan, Austin, TX (US); Manish K. Shah, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 65 days.

(21) Appl. No.: 18/657,715

(22) Filed: May 7, 2024

(65) Prior Publication Data

US 2024/0385921 A1    Nov. 21, 2024

Related U.S. Application Data

(60) Provisional application No. 63/468,292, filed on May 23, 2023, provisional application No. 63/468,095,
(Continued)

(51) Int. Cl.
| | |
|---|---|
| *G06F 11/07* | (2006.01) |
| *H04L 41/06* | (2022.01) |
| *H04L 43/50* | (2022.01) |

(52) U.S. Cl.
CPC ...... *G06F 11/0772* (2013.01); *G06F 11/0757* (2013.01); *G06F 11/0793* (2013.01); *H04L 41/06* (2013.01); *H04L 43/50* (2013.01)

(58) Field of Classification Search
CPC ............. G06F 11/0772; G06F 11/0757; G06F 11/0793; G06F 11/0721; H04L 41/06; H04L 43/50; H04L 41/0654
(Continued)

(56) References Cited

U.S. PATENT DOCUMENTS 6,630,946 B2 * 10/2003 Elliott .................. G06F 40/166
715/806
9,529,661 B1    12/2016 Miller et al.
(Continued)

FOREIGN PATENT DOCUMENTS

WO      2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Yair Leibovich
(74) *Attorney, Agent, or Firm* — FP; Bruce A. Young; Sikander M. Khan

(57)      ABSTRACT

A computing system is disclosed, comprising a host computer and multiple CGRPs (coarse-grained reconfigurable architecture processors) connected to the host computer through external communication links. Each CGRP includes an internal network, external interface circuits, memory interface circuits, arrays of configurable units, hang detection circuits, force-quit controllers, and a network recovery circuit with control registers. The host computer is programmed to configure and execute applications across the arrays of configurable units in both CGRPs. In case of a hang detection in one CGRP, the network recovery circuit initiates a force quit process and notifies the host computer. Additionally, the network recovery circuit compares application IDs and halts execution in the other CGRP if necessary. This system provides efficient failure tolerance and recovery mechanisms for parallel processing applications.

20 Claims, 12 Drawing Sheets

Related U.S. Application Data filed on May 22, 2023, provisional application No. 63/466,904, filed on May 16, 2023, provisional application No. 63/466,509, filed on May 15, 2023.

(58) Field of Classification Search
USPC .......................................................... 714/48
See application file for complete search history.

(56) References Cited

U.S. PATENT DOCUMENTS

| | | | |
|---|---|---|---|
| 10,831,507 | B2 | 11/2020 | Shah et al. |
| 11,055,141 | B2 | 7/2021 | Prabhakar et al. |
| 12,038,867 | B2 | 7/2024 | Shah et al. |
| 12,056,012 | B2 | 8/2024 | Shah |
| 12,143,298 | B2 | 11/2024 | Shah et al. |
| 12,210,857 | B2 | 1/2025 | Shah et al. |
| 12,271,333 | B2 | 4/2025 | Jordan et al. |
| 2017/0048121 | A1 | 2/2017 | Hobbs et al. |
| 2020/0159544 | A1 | 5/2020 | Shah et al. |
| 2021/0011770 | A1 | 1/2021 | Prabhakar et al. |
| 2021/0038982 | A1* | 2/2021 | Guillemette .......... A63F 13/428 |
| 2022/0164244 | A1 | 5/2022 | Elluri |
| 2024/0385920 | A1 | 11/2024 | Jordan et al. |
| 2024/0388493 | A1 | 11/2024 | Jordan et al. |
| 2024/0388519 | A1 | 11/2024 | Jordan et al. |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Nakka, et al., An Architectural Framework for Detecting Process Hangs/Crashes, EDCC 2005.

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

FAILURE RECOVERY IN A DISTRIBUTED COARSE GRAINED RECONFIGURABLE ARCHITECTURE

REFERENCES

This application claims the benefit of the U.S. Provisional Patent Application Ser. No. 63/466,509, filed May 15, 2023, entitled "GRAPH HANG DETECTION FOR RECONFIGURABLE PROCESSORS;" U.S. Provisional Patent Application Ser. No. 63/466,904, filed May 16, 2023, entitled "HARDWARE HANG DETECTION FOR RECONFIGURABLE PROCESSORS;" U.S. Provisional Patent Application Ser. No. 63/468,095, filed May 22, 2023, entitled "PACKET BASED CREDIT NETWORK FOR A RECONFIGURABLE DATA PROCESSOR;" and U.S. Provisional Patent Application Ser. No. 63/468,292, filed May 23, 2023, entitled "HANG DETECTION AND RECOVERY FOR A RECONFIGURABLE DATA PROCESSOR;" all of which are hereby incorporated by reference, as if it is set forth in full in this specification.

This application is related to the following US patent applications:

U.S. Nonprovisional patent application Ser. No. 16/197,826, now U.S. Pat. No. 10,831,507, filed Nov. 21, 2018, entitled "CONFIGURATION LOAD OF A RECONFIGURABLE DATA PROCESSOR;"

U.S. Nonprovisional patent application Ser. No. 16/504,627, now U.S. Pat. No. 11,055,141, filed Jul. 8, 2019, entitled "QUIESCE RECONFIGURABLE DATA PROCESSOR;"

U.S. Nonprovisional patent application Ser. No. 17/974,488, published as US 2023/0127793, filed Oct. 26, 2022, entitled "Force Quit of Reconfigurable Processor;"

U.S. Nonprovisional patent application Ser. No. 18/107,613, published as US 2023/0251839, filed Feb. 9, 2023, entitled "Head Of Line Blocking Mitigation In A Reconfigurable Data Processor;"

U.S. Nonprovisional patent application Ser. No. 18/107,690, published as US 2023/0251993, filed Feb. 9, 2023, entitled "TWO-LEVEL ARBITRATION IN A RECONFIGURABLE PROCESSOR;"

U.S. Nonprovisional patent application Ser. No. 18/218,562, published as US 2024/0020261, filed Jul. 5, 2023, entitled "PEER-TO-PEER ROUTE THROUGH IN A RECONFIGURABLE COMPUTING SYSTEM;"

U.S. Nonprovisional patent application Ser. No. 18/383,718, published as US 2024/0073129, filed Oct. 25, 2023, entitled "PEER-TO-PEER COMMUNICATION BETWEEN RECONFIGURABLE DATAFLOW UNITS;"

U.S. Nonprovisional patent application Ser. No. 18/657,619, filed on May 7, 2024, entitled "HANG DETECTION IN A COARSE-GRAINED RECONFIGURABLE ARCHITECTURE PROCESSOR;"

U.S. Nonprovisional patent application Ser. No. 18/657,635, filed on May 7, 2024, entitled "NETWORK HEALTH MONITOR WITHIN A COARSE-GRAINED RECONFIGURABLE ARCHITECTURE PROCESSOR;" and U.S. Nonprovisional patent application Ser. No. 18/657,704, filed on May 7, 2024, entitled "SWITCHES WITH A WATCHDOG TIMER FOR USE IN AN INTERNAL NETWORK OF A PROCESSOR."

The related patent applications listed above are hereby incorporated by reference, as if it is set forth in full in this specification.

The following publications are incorporated by reference for all purposes:

Prabhakar et al., "Plasticine: A Reconfigurable Architecture for Parallel Patterns," ISCA '17, Jun. 24-28, 2017, Toronto, ON, Canada; and Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

BACKGROUND

Technical Field

The present technology relates to a hang detection logic to detect whether an application executing on a distributed architecture, such as a coarse-grained reconfigurable architectures (CGRAs), has ceased to make progress.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Artificial Intelligence (AI) and Machine Learning (ML) have become increasingly important over the last few years, with Graphics Processing Units (GPUs) becoming a common architecture for running AI/ML applications. Many AI/ML applications can be expressed as a dataflow graph to implement a neural network architecture. The dataflow graph can be trained using training data and errors back-propagated through the dataflow graph to train the system. Once the system has been trained, it can be used to make inferences based on new data.

Coarse-grained reconfigurable architectures (CGRAs) exhibit far superior performance over conventional architectures, such as field programmable gate arrays (FPGAs) or even GPUs, as they provide the capability to execute applications as nested dataflow pipelines. However, as in any computing system, an application can sometimes encounter bugs or other exceptional conditions that may cause the application to cease making progress. An application is said to be hung if it encounters a condition where it is no longer making progress. Examples of an application that is no longer making progress include one where a first node is waiting on data from a second node, while the second node is waiting on data from the first mode, which results in a deadlocked condition. Another situation where an application may cease making progress is one where data needs to be sent across a network which is no longer functioning properly, causing the application to stall. Yet another situation where an application may cease making progress is a loop where the condition required to exit the loop never occurs. Many other things can cause an application to hang, too numerous to cite herein.

BRIEF DESCRIPTION OF THE DRAWINGS

The technology will be described with reference to the drawings, in which.

Figure 1:
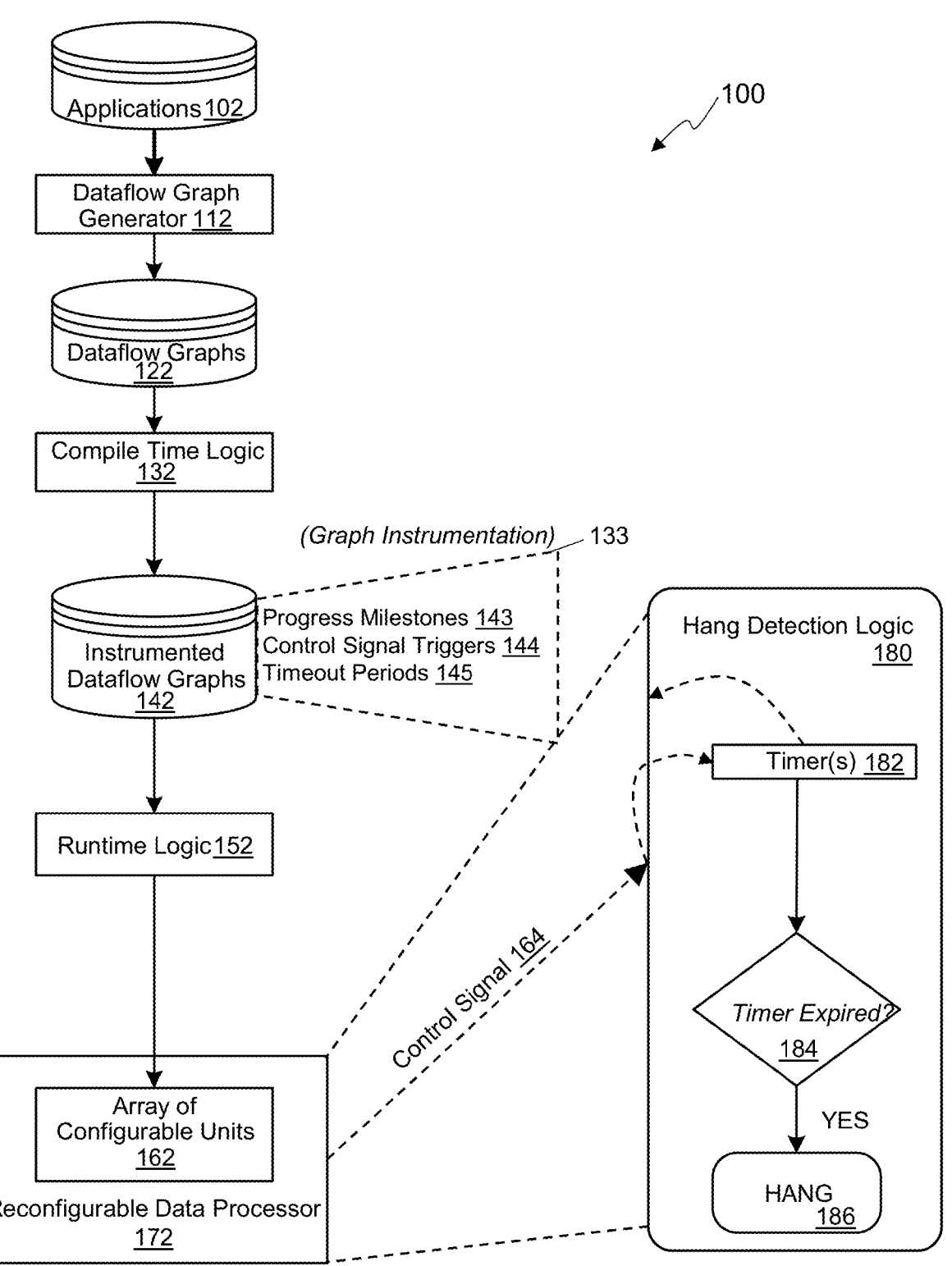
FIG. 1 illustrates a computing system including a reconfigurable data processor and implementing an example of hang detection for an instrumented dataflow graph application.

In the figures, like reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

There can be times when an application (e.g., a deep learning graph) executing on a computing system using a coarse-grained reconfigurable architecture hangs (or ceases to make progress) and does not finish execution. The application is said to be hung if it encounters an exceptional condition such that it is no longer able to continue execution or ceases to make progress. In one example, a hang can be detected when the application, after being loaded onto the coarse-grained reconfigurable architecture processor (CGRP), does not execute any instructions, does not respond to external inputs, or otherwise makes no progress. In another example, a hang can be detected when the application hangs in infinite execution of legitimate loops due to design or implementation errors in the application, illegal inputs, or hardware errors that cause the condition for the execution of a loop to be always true. In yet another example, a hang can be detected when the application hangs in illegal loops.

Disclosed herein are systems, methods, and circuits for a data processing system including hang detection logic, (i.e., hang detection circuits) to detect hangs in applications executing on reconfigurable architectures like coarse-grained reconfigurable architectures (CGRAs) and other distributed processing architectures.

Additionally, disclosed herein are some implementations which relate to a hang detection logic to detect failures in hardware or particularly, in a network internal to the processor during execution of applications on reconfigurable architectures like coarse-grained reconfigurable architecture processors (CGRPs) and other distributed processing architectures.

Additionally, disclosed herein are some implementations which relate to watchdog timers in switches of the internal network for hardware hang detection in reconfigurable data processors during execution of applications on reconfigurable architectures like CGRPs and other distributed processing architectures.

Furthermore, disclosed herein are some implementations which relate to a hardware hang recovery logic to manage hardware of reconfigurable architectures like CGRPs and other distributed processing architectures after detecting hangs in applications executing on those.

Generally speaking, as operations of the instrumented dataflow graphs are executed on an array of configurable units in a CGRP, some operations may hang or cease making progress. To detect the hang, the disclosed hang detection logic uses progress milestones in conjunction with a timer. Complete execution of a progress milestone by one or more configurable units in the array of configurable units causes the configurable units to generate control signals (or status tokens). In one implementation, the configurable units generate the control signals in response to detecting a control signal trigger in the configuration data used to configure the CGRP to execute at least a portion of the instrumented graph. The control signal indicates completion of execution of a corresponding progress milestone by the configurable units. In response, the hang detection logic resets a time corresponding to the progress milestone.

In some implementations, the hang detection logic has one timer for some, or all progress milestones defined for an instrumented dataflow graph. In other implementations, the hang detection logic has multiple timers associated with respective progress milestones defined for the instrumented dataflow graph. When the hang detection logic determines that a timer, set for a timeout period defined for an associated progress milestone, has expired without being reset, the hang detection logic determines that a hang has occurred.

In some implementations, the hang determination is communicated to a network recovery circuit over an internal network. In some implementations, in response to the hang determination, the configurable units that failed to complete execution of the associated progress milestone are subjected to quiescing as described in U.S. Pat. No. 11,055,141 entitled "QUIESCE RECONFIGURABLE DATA PROCESSOR" or a force-quit operation as described in published US patent application US 2023/0127793, filed Oct. 26, 2022, entitled "Force Quit of Reconfigurable Processor," both of which are a part of this disclosure. In some implementations, in response to the hang determination, the configuration files may be reloaded into the reconfigurable processor.

Implementations of a network health monitor circuit are also described herein. The network health monitor network can perform an ongoing self-test of an internal network within a CGRP by periodically writing and then reading a health monitor register in other agents on the internal network. The health monitor registers might not have any other function than to be used in the self-test of the network and hold data written to them over the internal network and allow the data to be read back over the internal network. The network health monitor circuit can compare the data read to the data written and detect a network failure if they are not the same.

The health monitor registers may, in some implementations, generate a reply when written to that is beyond that is required by a network protocol of the internal network. The reply may include a token sent over a request network of the internal network to test the connection between the request network and the agent where the health monitor register resides. The network health monitor circuit may include a timeout mechanism to detect a network failure if the reply from the health monitor register is not received within a timeout period.

In some implementations, an agent on the internal network may be able to act as a proxy for the network health monitor circuit, allowing the network health monitor circuit to command that agent to write and then read a health monitor register of a third agent on the internal network. This allows the connections used for an initiator on the internal network for that agent to be tested. The agent acting as a proxy simply forwards the write request and write data from the network health monitor circuit to the third agent and forwards responses from the third agent back to the network health monitor circuit. Then the proxy forwards the read request network health monitor circuit to the third agent and forwards the responses, including the read data, from the third agent back to the network health monitor circuit. The network health monitor circuit compares the data received from the read to the data sent for the write to detect whether a network failure has occurred. The timeout mechanism discussed above may also be used to detect a network failure when the proxy is used.

Implementations of a network switch with a watchdog timer are also disclosed herein. The switch may be used in the internal network which may be implemented as four separate packet-switched mesh networks or any other type of packet-switched topology. The switch includes a plurality of input ports and a plurality of output ports with buffers to store packets received on the input ports until they can be sent out an appropriate output port based on a routing algorithm and destination information included with the packet. The watchdog timer monitors the amount of time that the packets are stored in the buffers and sends a timeout message to the network recovery circuit if one or more packets are held in the buffers of the switch for longer than a timeout period. The timeout message may be sent through a non-blocking portion of the internal network, such as the response network or the credit network, or may be sent through another communication link, such as a direct wire connection between the switch and the network recovery circuit.

Implementations for managing a system including a CGRP are also disclosed. A computing system may include one or more CGRPs each with one or more arrays of configurable units. An application may be partitioned into multiple dataflow graphs which are then assigned to respective arrays. The arrays used for a single application may be in multiple CGRPs. If one of the arrays assigned to the application hangs, its CGRP may halt execution of other arrays in that CGRP which are assigned to the same application. It may also interrupt a host processor which can then communicate with other CGRPs that have at least one array assigned to the application to halt execution in each array assigned to the application.

In addition, a CGRP may receive packets through external communication links from other CGRPs that are destined for a hung array. To avoid creating congestion on the internal networks of any CGRP involved in that communication, a CGRP may determine whether a destination agent for a received packet has been marked as hung. If the destination agent has been marked as hung, the packet is discarded instead of being sent over the internal network.

Unless otherwise specified, the use of ordinal adjectives first, second, third, etc., to describe an object, merely refers to different instances or classes of the object and does not imply any ranking or sequence.

The term "coupled" is used in an operational sense and is not limited to a direct or an indirect coupling. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

Implementations

FIG. 1 illustrates an example computing system 100 including a reconfigurable data processor 172 and implementing disclosed hang detection logic 180 for an instrumented dataflow graph 142 application. A dataflow graph generator 112 processes applications 102 and generates dataflow graphs 122. Compile time logic 132 (e.g., a compiler) instruments the dataflow graphs 122 and generates instrumented dataflow graphs 142. Instrumentation 133 by the compile time logic 132 can include analyzing the dataflow graphs 122 and determining progress milestones 143 (or execution boundaries) for operations in the dataflow graphs 122. Progress milestones 143 can be set on a per-loop basis to correspond to entry and exit points of loops.

Alternatively, or additionally, progress milestones 143 can be set for multiple loops in the dataflow graphs 122.

Instrumentation 133 by the compile time logic 132 can further include assigning a timeout period 145 for the progress milestones 143. The timeout period 145 can correspond to how long (e.g., how many clock cycles) it takes to execute the operations grouped into a progress milestone. In some implementations, the timeout period 145 can vary from progress milestone to progress milestone, for example, depending on the number of instructions (e.g., FLOPS) required to execute the operations grouped into a progress milestone 143. In other implementations, a common timeout period can be assigned to some or all progress milestones.

Instrumentation 133 by the compile time logic 132 can further include inserting control signal triggers 144 (e.g., control flow assertion checks like CHECK instructions such as CHECK LOOP start or CHECK LOOP End) in the dataflow graphs 122 to specify the progress milestones. A control signal can be generated 144 upon completion of a corresponding progress milestone 143.

The instrumented dataflow graphs 142 are application binaries with configuration data generated by the compile time logic 132 for the dataflow graphs 122. The configuration data defines the progress milestones 143, the corresponding control signal triggers 144, and the corresponding timeout periods 145 as well as the operation of the application 102. A runtime logic 152, executing on a host processor coupled to the reconfigurable data processor 172 during runtime, loads at least a portion of the instrumented dataflow graphs 142 onto an array of configurable units 162 of a reconfigurable processor 172 for execution. The runtime logic 152 uses the configuration data to configure and reconfigure configurable units in an array of configurable units 162 in the reconfigurable data processor 172.

Hang detection logic (i.e., a hang detection circuit) 180 is included in the reconfigurable data processor 172. The hang detection logic (HDL) 180 includes one or more timers 182 (which may be implemented as counters) that can be set based on a timeout period 145 and reset by a control signal 164 generated by execution of a control signal trigger 144 in the instrumented dataflow graph 142. If the timer 182 expires 184, a hang condition 186 is detected. Some implementations have a single timer 182 for the array of configurable units 162 that is reset by one or more control signals 164 generated by one or more configurable units in the array of configurable units 162 upon completion of various progress milestones 143. In other implementations, multiple timers 182 may be included that can be set to the same or different timeout periods 145 by the runtime logic 152 and are reset by different controls signals 164 generated at the completion of different progress milestones by executing control signal triggers 144 in various configurable units in the array of configurable units 162. The timer(s) 182 can be enabled or disabled by the runtime logic 152 so that they don't detect a hang condition 186 during times that the array of configurable units 162 are not actively executing the instrumented dataflow graph 142.

Figure 2:
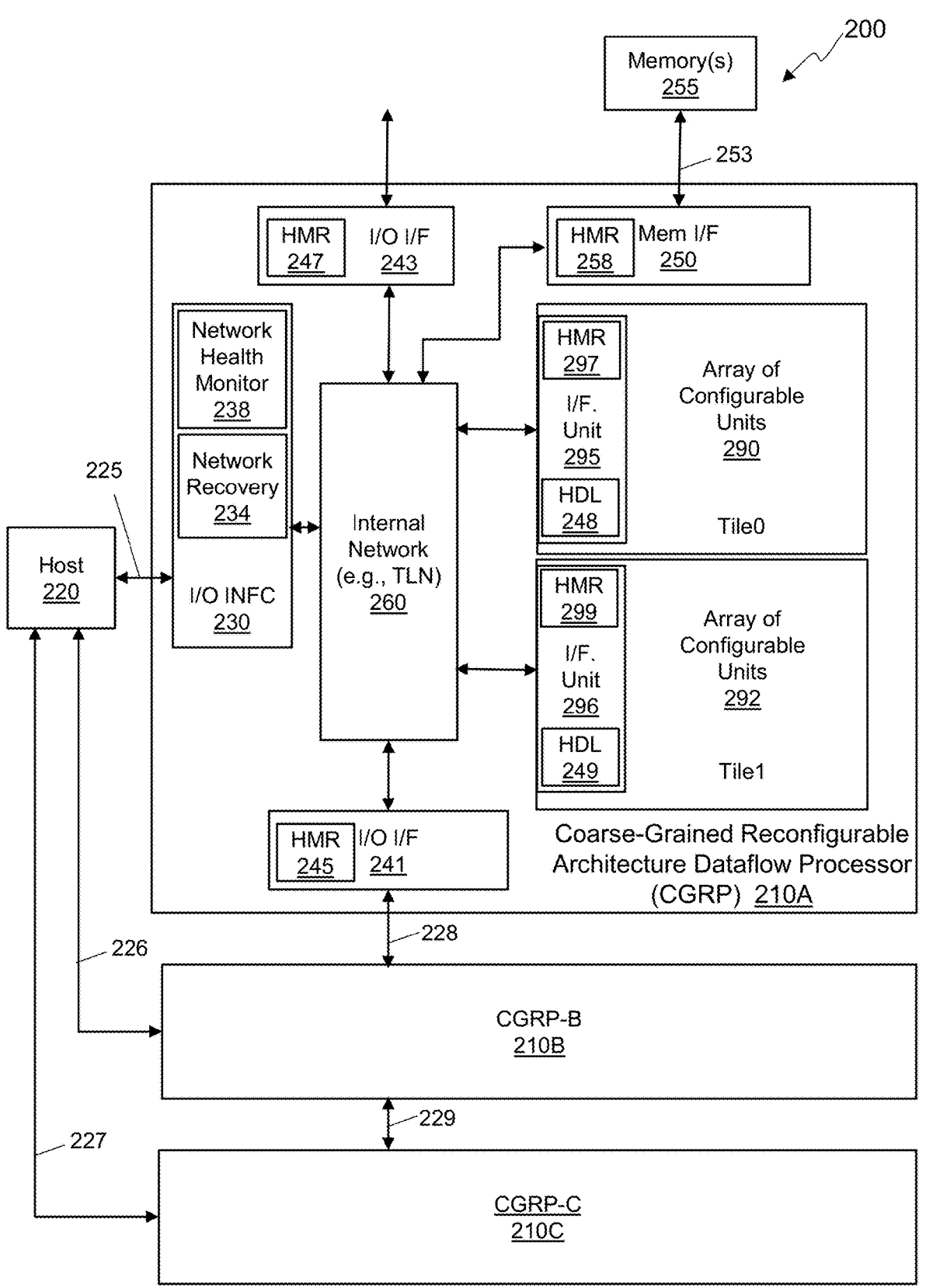
FIG. 2 is a block diagram of an example computing system having multiple coarse-grained reconfigurable architecture dataflow processors (CGRPs) coupled to a host and implementing various functions described herein.

FIG. 2 is a block diagram of an example computing system 200 having multiple coarse-grained reconfigurable architecture dataflow processors (CGRPs) 210A, 210B, 210C coupled to a host 220. The host 220 can be any type of computer or multiple computers that execute one or more runtime programs similar to the runtime logic 152 shown in FIG. 1. The host 220 in the example system 200 is coupled to each CGRP via an external communication link, so link 225 couples host 220 to CGRP 210A, link 226 couples host 220 to CGRP-B 210B, and link 227 couples host 220 to CGRP-C 210C. In the example shown, CGRP 210A is also coupled to CGRP-B 210B via link 228 and CGRP-B is coupled to CGRP-C via link 229. Various implementations of systems can include any number of hosts and CGRPs interconnected in various topologies. The links 225-229 can be any appropriate type of communication link or network including, but not limited to Peripheral Component Interconnect Express (PCIe) links or networks, Ethernet networks that may or may not include one or more routers and/or switches, and InfiniBand networks, and may use any sort of physical layer including copper interconnects and/or optical fiber interconnects.

CGRP 210A, CGRP-B 210B and CGRP-C 210C may each be implemented as an integrated circuit (IC). An IC may be a monolithically integrated circuit, i.e., a single semiconductor die, which may be delivered as a bare die or as a packaged circuit. For at least for the purposes of this document, an IC may also refer to a packaged circuit that includes multiple semiconductor dies, stacked dies, or multiple-die substrates. Such constructions are now common in the industry, produced by the same supply chains, and for the average user often indistinguishable from monolithic circuits. While FIG. 2 shows internal detail only for CGRP 210A, CGRP-B 210B and CGRP-C 210C may have similar structures to those shown for CGRP 210A and may have additional connections to local external memory and/or other networks which are not shown.

CGRP 210A includes an internal network 260 with several functional blocks coupled to the internal network 260, which also may be referred to as a top-level network (TLN). The number and type of functional blocks coupled to the internal network 260 may vary between implementations. Example CGRP 210A includes an external interface circuit 230 coupled between the TLN 260 and the external communication link 225 to allow for communication between the host 220 and CGRP 210A. The external interface circuit 230 in the example CGRP 210A includes a network health monitor 238 that may perform various self-tests to determine whether the internal network 260 is operating properly and a network recovery circuit 234 to help ensure that the system 200 can continue to operate even if an application running on the CGRP 210A is hung. Other implementations may integrate the network heath monitor 238 and/or the network recovery circuit 234 with other circuitry in the CGRP 210A or they may be implemented as stand-alone circuits within the CGRP.

Various implementations may include any number of external interface circuits with the example CGRP 210A having two additional interfaces 241, 243 to external communication links. The interface 241 includes a health monitor register 245 and the interface 243 includes a health monitor register 247 that may be used by the network health monitor 238 as a part of the self-test.

CGRP 210A also includes a memory interface 250 coupled to an external memory 255 through a memory interconnect 253. The memory interface 250 may support any type of external memory, including, but not limited to, dynamic data rate (DDR) memory, high bandwidth memory (HBM), other dynamic random access memory (DRAM) technologies, and flash memory. Various implementations may include other memory interfaces that support another bank of the same type of memory as memory 255 or may support another memory type. For example, an implementation may support DDR memory as memory 255 through memory interface 250 and include another memory interface that supports HBM. Any number of memory interfaces may be included, depending on the implementation. The memory interface 250 includes a health monitor register 258 that may be used by the network health monitor 238 as a part of the self-test.

A CGRP can include any number of arrays of configurable units, with the example CGRP 210A having a first array of configurable units 290, which may also be referred to as Tile0, and a second array of configurable units 292, which may also be referred to as Tile1. An array 290, 292 can include one or more interface units 295, 296 to couple the array 290, 292 to the internal network 260. The interface units 295, 296 may be referred to as address generation and coalescing units (AGCUs) in some implementations. The first array of configurable units 290 has an interface unit 295 which is coupled between the internal network 260 (i.e. TLN) and an array-level network that couples the interface unit 295 to other configurable units in the array 290. The interface unit 295 may include hang detection logic (HDL) 248, which also may be referred to as a hang detection circuit, and also may include a health monitor register 297 that may be used by the network health monitor 238 as a part of the self-test. Note that if the array 290 includes more than one interface unit, each interface unit that connects to the internal network 260 may include its own health monitor register. The HDL 248 includes one or more timer(s) similar to the timer(s) 182 of FIG. 1. The second array of configurable units 292 has an interface unit 296 which is coupled between the internal network 260 (i.e. TLN) and an array-level network that couples the interface unit 296 to other configurable units in the array 292. The interface unit 296 may include hang detection logic (HDL) 249, which also may be referred to as a hang detection circuit, and may also include a health monitor register 299 that may be used by the network health monitor 238 as a part of the self-test. The HDL 249 also includes one or more timer(s) similar to the timer(s) 182 of FIG. 1.

The interface configurable units 295, 296 can include respective configuration load controllers that can be used to read configuration files that have been stored in the memory 255 by the host 220. The configuration files are used to configure the array of configurable units to execute at least a portion of an application. The interface configurable units 295, 296 also include respective configuration unload controllers that can be used to load computational results from the array of configurable units into the memory 255 upon completion of the portion of the application. The configuration load controller and the configuration unload controller may be implemented using separate logic and data path resources or may be implemented using shared logic and data path resources as suits a particular embodiment. See U.S. Pat. No. 10,831,507 entitled "CONFIGURATION LOAD OF A RECONFIGURABLE DATA PROCESSOR," which forms a part of this disclosure, for more detail on an example implementation.

The internal network 260 (i.e., TLN) may be any type of network in different implementations. In at least one example, the internal network 260 is a set of 4 packet-switched networks, a request network, a response network, a data network, and a credit network. The request network is used to request transactions on the internal network and the response network is used to send responses to the transactions requested on the request network. The data network is used to transmit data for the transactions requested on the request network and the credit network is used to transmit credit tokens that manage traffic on the request network and the data network. The request network, the response network, the data network, and the credit network that make up the internal network 260 are configured to operate concurrently as separate mesh networks having a plurality of links connected by switches which may use dimension-order routing. At least the response network can be implemented as a non-blocking dimensionally routed mesh network. See published US patent application 2023/0251839 entitled "Head Of Line Blocking Mitigation In A Reconfigurable Data Processor" and 2023/0251993 entitled "TWO-LEVEL ARBITRATION IN A RECONFIGURABLE PROCESSOR," both of which are a part of this disclosure, for more information about an example internal network.

Figure 3:
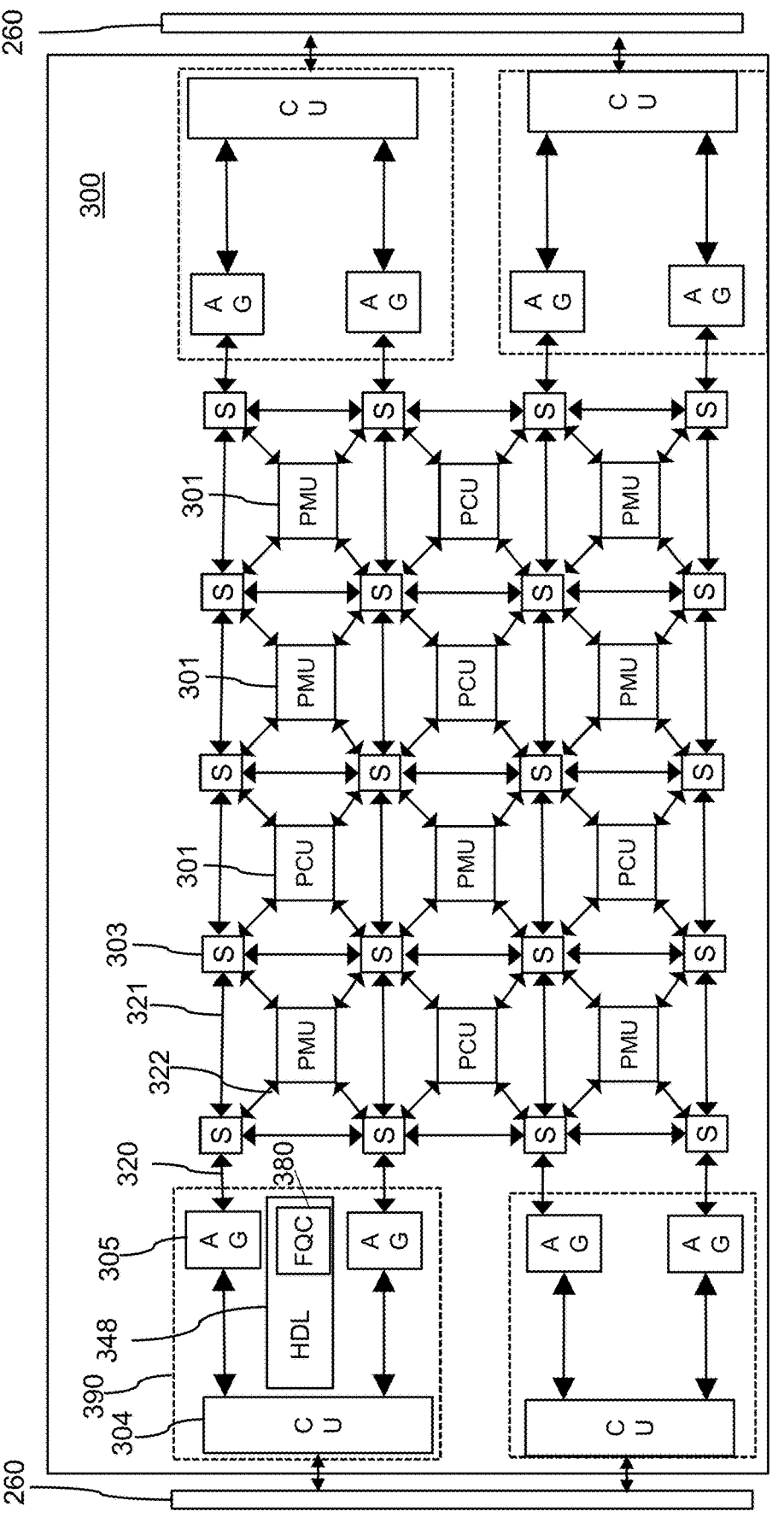
FIG. 3 is a block diagram of an example array of configurable units as may be included in a CGRP.

FIG. 3 is a block diagram of an example array 300 of configurable units as may be included in an example CGRP, such as Tile0 290 and/or Tile1 292 in FIG. 2. Coarse-grained reconfigurable (CGR) array 300 may include several types of CGR units 301 (only some of which are so labeled in FIG. 3), such as local scratchpad memory units (e.g., pattern memory units—PMUs), compute units (e.g., pattern compute units—PCUs), and/or fused compute-memory-units (FCMUs). For examples of the functions of these types of CGR units, see Prabhakar et al., "Plasticine: A Reconfigurable Architecture for Parallel Patterns," ISCA 2017, Jun. 24-28, 2017, Toronto, ON, Canada. Each of the CGR units 301 may include a configuration store comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. The configuration data stores may be loaded with portions of the instrumented dataflow graphs 142 as described in FIG. 1, including the progress milestones 143 and the control signal triggers 144.

In some implementations, each CGR unit 301 comprises an FCMU. In other implementations, the array comprises memory units and compute units arranged in a checkerboard pattern as shown in FIG. 3. In yet other implementations, CGR units may be arranged in different patterns. The CGR units are interconnected through an array-level network (ALN). The ALN includes switch units 303 (S) that are connected among themselves via interconnects 321 and to a CGR unit 301 with interconnects 322. Switch units 303 may be coupled with address generators 305 via interconnects 320. In some implementations, communication channels can be configured as end-to-end connections, and switch units 303 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 321 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure. The control bus can carry control handshakes such as tokens and other signals.

The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. A CGR unit 301 may have four ports (as drawn) to interface with switch units 303, or any other number of ports suitable for an ALN. Each port may be suitable for receiving and transmitting data, or a port may be suitable for only receiving or only transmitting data.

A switch unit may have eight interfaces. The North, South, East and West interfaces of a switch unit may be used for links between switch units using interconnects 321. The Northeast, Southeast, Northwest, and Southwest interfaces of a switch unit may each be used to make a link with an FCMU, PCU or PMU instance using one of the interconnects 322. Each of the eight interfaces of a switch unit can include a vector interface, a scalar interface, and a control interface to communicate with the vector network, the scalar network, and the control network. In other implementations, a switch unit may have any number of interfaces.

Two switch units in each CGR array quadrant have links to an interface configurable unit 390 using interconnects 320. The interface configurable unit may include two address generation units (AG) 305 and a coalescing unit (CU) 304 and may be referred to as an address generation coalescing unit (AGCU). The CU arbitrates between the AGs and processes memory requests. In some implementations, one AGCU 390 may be a master AGCU for the array 300 and may include additional circuitry not included in the other AGCUs in the array 300. For example, the master AGCU 390 may include configuration load and unload controllers, the hang detection circuit (HDL) 348, and the force-quit controller 380. Each AGCU 390 also is coupled to the TLN 260 to allow the CGR units 301 to communication with resources outside of the array 300.

Compile time logic is configured to instrument the application with the at least one progress milestone and may be further configured to define a timer value for the timer in the HDL 348. If there are multiple timers, the compile time logic is further configured to define a time value for each of the multiple timers. The instrumented application is compiled into one or more configuration files to utilize one or more CGRPs, such as CGRP 210A, CGRP-B 210B, and/or CGRP-C 210C.

An application, which may be a portion of a larger application, may execute on a CGR array which includes a control bus coupled to the configurable units 301 in the array of configurable units, such as the array 300. Thus, the array of configurable units is configurable to execute the application with at least one progress milestone. The application may include multiple graphs or subgraphs specifying data processing operations that are distributed among, and executed by, corresponding CGR units 301 (e.g., FCMUs, PMUs, PCUs, AGs, and CUs). A configurable unit in the array of configurable units sends the control signal to the hang detection circuit 348 in response to completion of a progress milestone.

The hang detection circuit 348 is coupled to the control bus and includes a timer that resets in response to receiving a control signal via the control bus. Some implementations may include a second timer, and in some cases other additional timers, that reset in response to receiving a respective control signal via the control bus that indicates completion of a progress milestone in the at least one progress milestone associated with that timer. The hang detection circuit 348 detects a hang condition in the execution of the application based on an expiration of the timer. If multiple timers are included in the hang detection circuit 348, it may also detect the hang condition based on an expiration of any of a set of the timers or on expiration of all of a set of timers.

Upon detection of the hang condition, the HDL 348 sends a hang message to the external interface circuit 230 over the internal network 260. The external interface circuit 230 includes a network recovery circuit 234 that receives the hang message and is configurable to send an interrupt to the host computer 220 through the external communication link 225 in response. The internal interface circuit 230 also can send a force quit message to the force-quit controller 380 over the internal network 260 in response to receiving the hang message. The force-quit controller 380 stops execution of the application on the array of configurable units 300 in response to receiving the hang message. See published US application 2023/0127793 entitled "Force Quit of Reconfigurable Processor" for more details on an example implementation of a force-quit command in a reconfigurable processor.

In an alternative implementation, some or all of the CGR units 301 may include a timer in place of, or in addition to, the timer in the hang detection circuit 348 in the AGCU 390. These timers can operaten similarly to the timer in the HDL 348 by being reset by a control signal in response to the application running on that CGR unit 301 encountering a progress milestone. The timer(s) in the CGR units 301 can then communicate with the HDL 348 for further action in response to the timer expiring.

Figure 4:
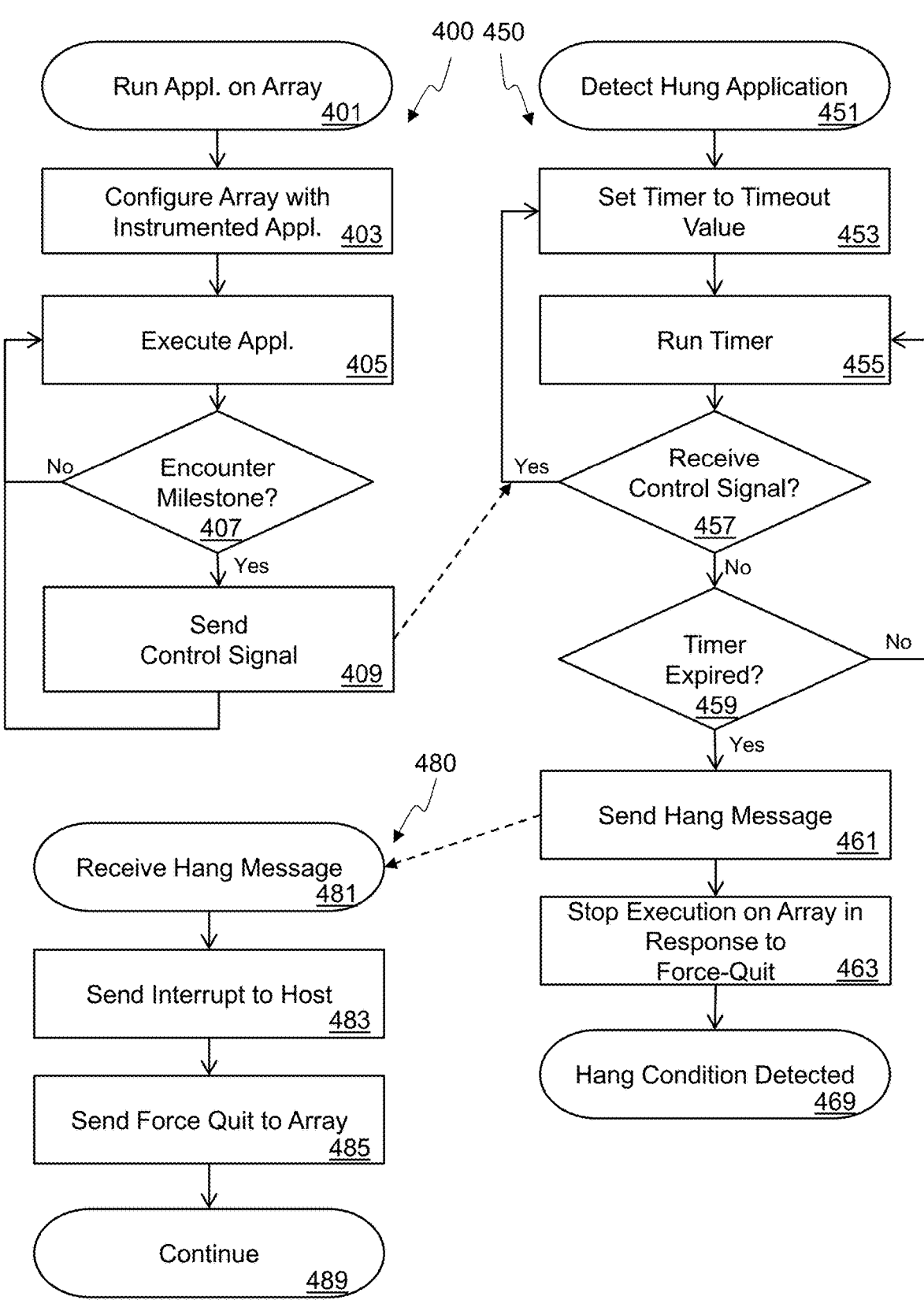
FIG. 4 shows three flowcharts implementing an example of a method for detecting an application that has hung during execution in an array of configurable units.

FIG. 4 shows three flowcharts 400, 450, 480 implementing an example of a method for detecting an application that has hung during execution in an array of configurable units. The flowchart 400 shows that activity of an application running 401 on an array of configurable units. The array is configured 403 to run the instrumented application, or at least a portion of the instrumented application. The array then executes 405 its portion of the application until it encounters 407 a milestone. In response to encountering 407 the progress milestone during execution 405 of the application in the array of configurable units, the configurable unit that encountered the milestone sends 409 a control signal via a control bus from a configurable unit in the array of configurable units to the hang detection circuit.

Flowchart 450 shows the action of the hang detection circuit associated with an array of configurable units for detecting a hung application 451. A timer in the hang detection circuit associated with the array of configurable units is set 453 to a timeout value. The timeout value may have been calculated by the compiler and may be included in the configuration information provided to the array of configurable units. During execution of the application 405, the timer runs 455. The timer is reset 453 to the timeout value in response to receiving 457 the control signal via the control bus. The control signal was sent 409 in flowchart 400. If the timer expires 459, meaning that it ran for its full timeout value without being reset, a hang condition is detected 469 and various actions may be taken, as shown. In response to detecting the hang condition, a hang message is sent 461 to the network recovery circuit in the external interface circuit. The hang message may be sent 461 over the internal network coupling the array of configurable units to the external interface circuit, or by other mechanisms, such as a dedicated wired connection. In some implementations, a force quit controller associated with the array may stop execution of the application on the array, but in other implementations, the force-quit controller may wait to receive a force-quit signal before stopping execution 463 on the array.

Flowchart 480 shows the action of the network recovery circuit in response to receiving 481 the hang message sent 461 in flowchart 450. The network recover circuit sends 483 an interrupt from the external interface circuit to a host computer through an external communication link. It may also send 485 a force quit message to a force-quit controller over the internal network (or by some other mechanism within the CGRP) in response before continuing 489 regular operations.

A compiler, which may include a multi-application suite such as a pre-compiler and a compiler, may run on the host 220 or on some other computer that receives a dataflow graph application for compilation and inserts progress milestone into the dataflow graph application to generate an instrumented dataflow graph application. The instrumented dataflow graph application is then compiled to generate a configuration file which can be loaded into the array of configurable units and initiate execution of the instrumented dataflow graph application as the application. The compiler may also determine a value for the timer based on an expected time between times that the progress milestone is to be encountered during execution of the application and include that value in the configuration file where it can be used to initiate and/or reset the timer with the value.

Figure 5:
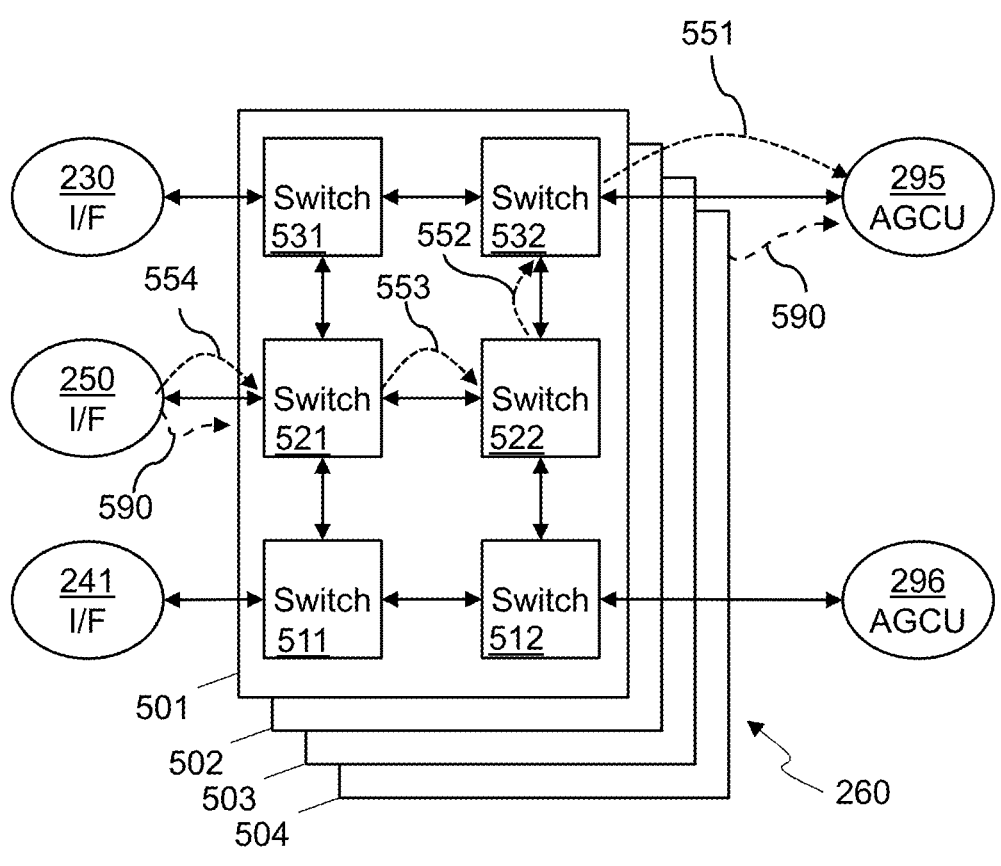
FIG. 5 is a more detailed block diagram of an example internal network in a CGRP showing credits used to manage packets flowing through the internal network.

FIG. 5 is a more detailed block diagram of an example internal network 260 in a CGRP. It includes the external interface circuit 230, the memory interface 250, I/O interface 241, and the interface configurable units (or AGCUs) 295, 296 but leaves out I/O interface 243 shown in FIG. 2 for clarity. Note that the internal network 260 can have any number of agents connected to it, depending on the implementation.

The internal network 260 includes 4 networks that can operate concurrently, the request network 501, the response network 502, the data network 503, and the credit network 504. Each of the 4 networks are a packet-switching mesh network similar to that shown for the request network 501. The detail shown for the request network 501 is omitted from the other networks in FIG. 5 for clarity. In the simple example shown in FIG. 5, the request network 501 includes an array of 3 rows by 2 columns of switches 511-532 that each receive a packet on an input port, determine how to route the packet, and then send the packet out through the determined output port. Any routing algorithm may be used, but in at least one implementation, the packet is routed vertically to the row of the intended destination, and then horizontally to the destination.

FIG. 5 also illustrates an example of using credits 551-554 to manage packets flowing through the internal network 260. Because the switches 511-532 store received packets before sending them out, a hop credit mechanism may be used to ensure that a switch has room to accept a packet before its neighboring switch sends the packet. In the internal network 260 hop credits 551-554 are sent from an input port to an adjacent output port to indicate that the input port has room in its buffers (e.g., a first-in-first-out or FIFO buffer) to accept a packet of information. In at least one implementation, there is a one-to-one correspondence between hop credits and a number of packets that the buffer can hold. Similarly, each TLN agent 230, 250, 241, 295, 296 has the same responsibility when communicating with a switch 511-532. Additionally, an agent on the internal network 260 can use the credit network to send end-to end credits 590 to an origination agent to tell it that it can accept a packet. This keeps packets from being sent through the network 260 unless it is known that there is enough room at the final destination and thereby reduces congestion in the network 260.

So, for example, if the AGCU 295 wants to send data to memory coupled to the memory interface 250, it would send a write request to switch 532, which will use a header in the packet to determine which output to send the packet to. Using a vertical-first routing algorithm, the packet will be sent from switch 532 to switch 522. Switch 522 will receive the packet and forward it to switch 521, which will receive the packet and forward it to the memory interface 250. A response can then be sent over the response network 502 from the memory interface 250 to the AGCU 295 and then the write data can be sent over the data network 503 from the AGCU 295 to the memory interface 250. But before the packets can be sent on any of the networks, credits are used to ensure that the packets can flow through the internal network 260 as described later herein.

When a sender sends a packet to a receiver, there needs to be space in the receiver FIFO to hold the packet; otherwise, the packet may be lost or the network 260 clogged with packets that cannot be sent. To avoid any loss of packets, a credit protocol is implemented on the internal network 260, which means that the sender has to make sure that the receiver has space for the packet that is being sent. In order to implement this protocol, there are credit counters and credit limit registers in each agent on the internal network 260.

In general, there are two types of credits to manage flow control on TLN 260. As was discussed above, a first type of credit is a "hop" credit, which can occur between any two adjacent points such as any two nodes or between a node and an agent. A second type of credit is an "end-to-end" (E2E) credit, which can occur between any two endpoints, which can be any two agents on the internal network 260. For each credit protocol there is a sender and a receiver. The sender and the receiver participating in a hop credit protocol may be referred to as a "hop source" and a "hop destination" respectively. The sender and the receiver participating in an E2E credit protocol may be referred to as a source endpoint and a destination endpoint respectively.

In order to prevent persistent backpressure on the internal network 260, communication between agents on the internal network 260 is controlled by E2E credits. The source endpoint keeps an E2E credit counter for each destination endpoint which is initialized based on the size of the input buffer in the destination endpoint dedicated to that source endpoint, decremented for each packet sent from the source endpoint to the destination endpoint, and incremented for each E2E credit received over the credit network from that destination endpoint. The source endpoint can only send a packet to a destination endpoint if source endpoint's E2E credit counter for that destination endpoint is non-zero. Thus, source endpoint checks its E2E credit counter for the destination before initiating a transaction, and if there are no available credits on that E2E credit counter, it must wait until an E2E credit is received from that destination endpoint before the transaction can be placed on the network.

Hop credits are managed independently from the E2E credits but in a similar fashion, except that hop credits cover a single link from an output port to an input port of the mesh. Each output port in both the network agents 230, 241, 250, 295, 296 and the switches 511-532 keeps a hop credit counter to know whether the input port it is connected to has room for another packet. So, the hop credit counter for each output port is initialized based on the buffer size of an input port of an adjacent switch to which it is connected, decremented for each packet sent, and incremented for each hop credit received.

Going back to the example of the AGCU 295 wanting to write data to memory coupled to the memory interface 250 and looking at activity on the request network only, the memory interface 250 checks its E2E credit counter for the memory interface 250 and determines that it the E2E credit counter is non-zero so it can send its write request. The AGCU 295 initiates the transaction on the request network 501. At the individual link level, the output port of the AGCU 295 checks its hop credit counter and sees that the switch 532 has room to receive a packet and sends the packet of the write request, decrementing its hop credit counter in response. The switch 532 looks at a header in the packet and determines that it should be sent out of its south output port, checks the hop credit counter associated with its south output port, and after determining that credits are available, sends the packet to the north input port of switch 522. Switch 532 decrements the hop credit counter for its south output port and sends a hop credit 551 to the AGCU 295 signifying that it has removed the packet from its east input port buffer.

This continues between each link of the internal network, from switch 522, to switch 521 and to the memory interface 250, using the same hop credit protocol. Once the memory interface 250 has received and processed the packet, freeing a spot in its input buffer, it can send an E2E credit to the AGCU 295 through the credit network 504 which can them increment its E2E credit counter for the memory interface 250. While these two types of credits are used to reduce congestion and deadlocks in the internal network 260, there is always a possibility of a failure causing the network operate improperly or to hang.

Figure 6:
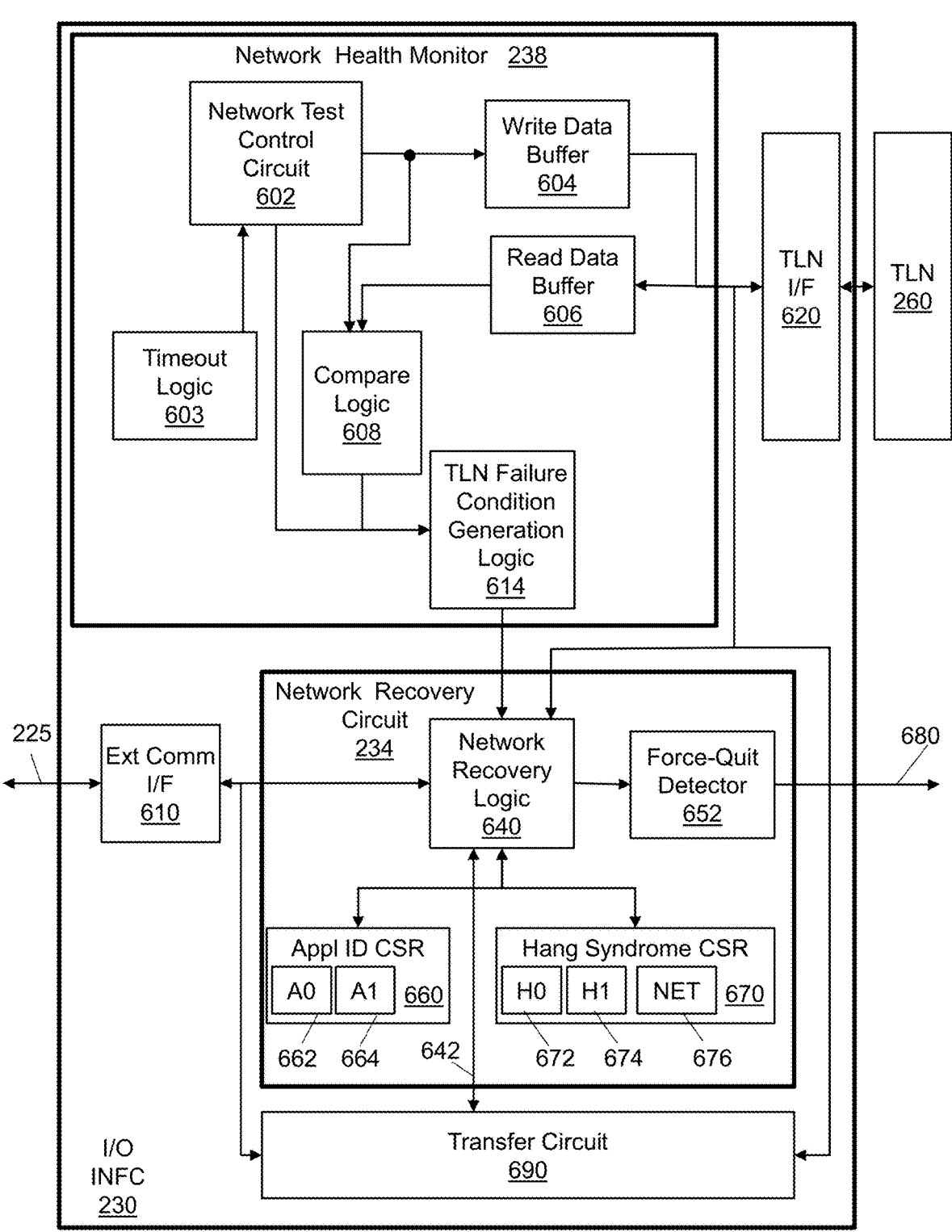
FIG. 6 is a more detailed block diagram of an example external interface circuit that includes an example network health monitor and an example network recovery circuit for use in a CGRP.

FIG. 6 is a more detailed block diagram of an example external interface circuit 230 for use in a CGRP. The example shown is one topology and other implementations may partition the functions differently. The interface circuit 230 has an external communication interface 610 coupled to an external communication link 225. The interface circuit 230 is also coupled to the TLN or internal network 260 through a TLN interface 620 which includes the credit counters and buffers discussed above. As disclosed earlier, the external interface circuit 230 includes a network health monitor 238 and a network recovery circuit 234. A transfer circuit 690 may include buffers and other circuitry to move data between the external communication interface 610 and the TLN interface 620. The transfer circuit 690 may communicate with the network recovery logic 640 through control interface 642 to allow the network recovery logic 640 to manage buffers in the transfer circuit 690, such as to have the transfer circuit 690 discard certain data received from the external communication link 225 instead of forwarding it to the TLN 260.

The network recovery circuit 234 includes network recovery logic 640 which can receive a hang message from the TLN 260 through the TLN interface 620 as described earlier. The network recovery logic 640 can take various actions in response to receiving the hang message, including, but not limited to, sending an interrupt to the host through the external communication interface 610 and the external communication link 225, sending a force-quit message 680 to the force-quit controller of the array of configurable units through the force quit detector 652, and setting one or more fields in a hang syndrome control/status register (CSR) 670, depending on which array of configurable units 290, 292 sent the hang message. The hang syndrome CSR 670 may be implemented as one or more registers with various fields, such as a first bit field H0 672 to indicate whether the first array of configurable units 290 has hung and/or has been sent a force-quit message, a second bit field H1 674 to indicate whether the second array of configurable units 292 has hung and/or has been sent a force-quit message, and a third bit field NET 676 to indicate that a network failure condition has been detected on the TLN 260. The network recovery circuit 234 also includes an application ID CSR 660 which may be implemented as one or more registers that include a first application ID field A0 662 associated with the first array of configurable units 290 and a second application ID field A1 664 associated with the second array of configurable units 292. The application ID fields 662, 664 can be used to identify what application is using its associated array of configurable units 290, 292.

The network health monitor 238 can perform various self-tests to determine whether the internal network 260 is operating properly. A network test control circuit 602 is configured to periodically test various paths in the TLN 260 by reading and writing the health monitor registers (HMRs) 245, 247, 258, 297, 299 in the various agents 241, 243, 250, 295, 296 connected to the TLN 260. Because the network 260 is implemented as a set of 4 packet-switched mesh networks, a test from one agent to any other single agent cannot test every link and switch in the network. This can easily be seen by looking at FIG. 5. A transaction from the interface circuit 230 to the memory interface 250 will only traverse switch 531 and switch 521, leaving the other switches in the network 260 and their associated links untested. In addition, the nature of the credit architecture of the network 260 means that each possible combination of source and destination would be tested in an ideal world to ensure that it is operational. This may be impractical to do in a large network, so implementations may directly test only a subset of possible combinations of source and destination. Implementations may also use selected agents on the internal network to act as proxies for the network health monitor 238. The network health monitor 238 may send transactions to the proxy agent to be forwarded to a third agent on the internal network. This allows for broader coverage of the links of the internal network, even if not everything is directly tested.

The network health monitor 238 generates write data in the network test control circuit 602 and sends that write data to the write data buffer 604 through the TLN interface 620 and the TLN 260 to a target, such as the HMR 297 in the interface configurable unit (i.e., AGCU) 295 of Tile0 290, the HMR 299 in the interface configurable unit (i.e., AGCU) 296 of Tile1 292, the HMR 245 in the interface circuit 241, the HMR 247 in the interface circuit 243, or the HMR 258 in the memory interface 250. The generated write data may include one or more of an ID of an initiator of the write, an ID of the target of the write, a timestamp, or a sequence number. Putting the write data into the write data buffer 604 may trigger sending a write request from the TLN interface 620 to the target over the request network of the TLN 260. The timeout logic 603 may be programmed to wait for up to a timeout period, which may be set by the runtime logic based on calculations from the compiler or may be set to a fixed value in hardware, to receive a reply from the target. If the reply is not received from the target before the end of the timeout period, the network test control circuit 602 may tell the TLN failure condition generation logic 614 to detect a network failure condition. The TLN failure condition generation logic 614 can communicate with the network recovery logic 640 to take one or more actions, such as interrupting the host 220, using the force-quit detector 652 to send a force-quit message to an array of configurable units to halt execution of an application being run by that array, and/or setting an appropriate field in the hang syndrome CSR 670.

The reply may include a response packet sent over the response network of the TLN 260 from the target to the network heath monitor 238. Additionally, some HMRs may include a test response token as a part of their reply. The test response token is sent over the response network from the target to the network health monitor 238 but does not require a response back to the target over the response network like most tokens sent over the response network. Specifically, HMR 297 in the interface configurable unit 295 and HMR 299 in the interface configurable unit 296 may include the test response token as a part of their reply. This allows the request network connection to the interface configurable units 295, 296 to be tested, which wouldn't otherwise be tested by simply writing and reading back data from the HMR 297, 299.

The write data is then sent from the write data buffer 604 to the target over the data network of the TLN 260. The network test control circuit 602 then sends a read request to the target over through the TLN interface 620 over the request network of the TLN 260 and when data for the read is received over the data network of the TLN 260 by the TLN interface 620, it is placed into the read data buffer 606. Compare logic 608 compares the write data in the write data buffer 604 to the read data in the read data buffer 606. If the read data is different than the write data, the TLN failure generation logic 614 detects a network failure condition and can inform the network recovery logic 640 so that further action can be taken.

The network health monitor 238 may then wait for a delay period, which may be fixed or programmable by the runtime logic, before initiating a write/read sequence to another HMR in the system. The delay period allows the amount of internal network bandwidth dedicated to this testing to be controlled. The network health monitor 238 can perform the write/read/compare to some or all of the agents on the TLN 260 to test the paths of network 260 between the I/O interface 230 and each of the agents.

Some other agents, such as the other I/O interfaces 241, 243 may include circuitry to forward requests sent from the network health monitor 238 to another agent on the TLN 260 to test those paths. The network health monitor circuit 238 may send a health test message to the second external interface circuit 241 over the internal network 260. This causes the second external interface circuit 241 to forward the health test message to the interface configurable unit 295 and forward a second test response token received on the request network from the interface configurable unit 295 back to the network health monitor circuit 238. The network health monitor 238 waits up to the timeout period to receive the second test response token from the second external interface circuit 241, and in response to not receiving the second test response token from the interface configurable unit 295 during the timeout period, detects the network failure condition. The second external interface circuit 243 may also, in response to receiving the health test message, forward second write data received from the network health monitor circuit 238 to the first health monitor register 297 over the data network and then forward a second read request received from the network health monitor circuit 238 to the first health monitor register 297 over the request network. It then forwards second read data received from the first health monitor register 297 to the network health monitor circuit 243 over the data network. The network health monitor circuit 238 can then use the compare logic 608 to compare the second read data to the second write data and detect the network failure condition in response to the second read data being different than the second write data.

Figure 7:
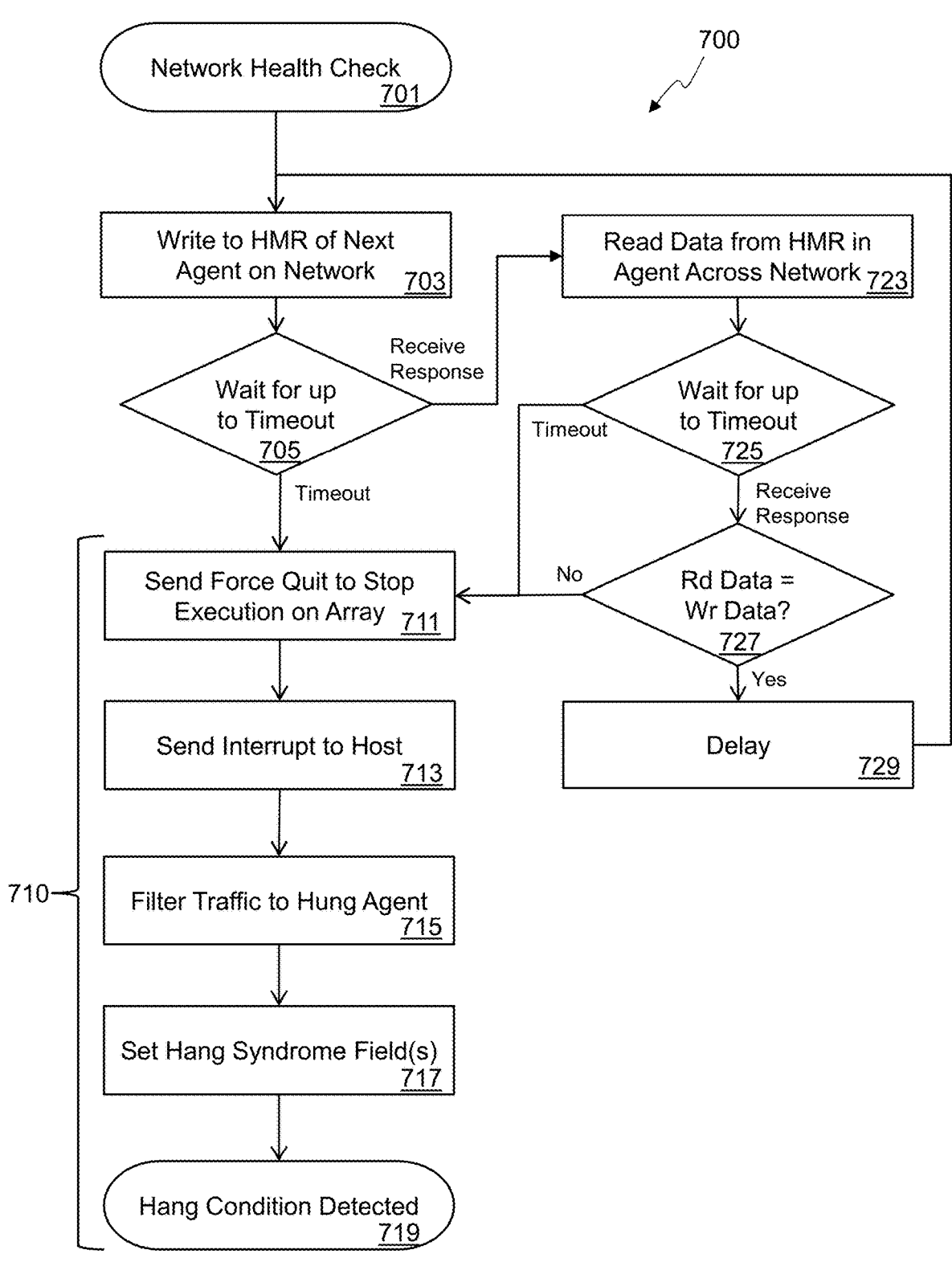
FIG. 7 shows a flowchart implementing an example of a method for detecting a malfunctioning network in a CGRP.

FIG. 7 shows a flowchart 700 implementing an example of a method for detecting a malfunctioning network in a CGRP by performing 701 a network health check. The health query is sent 703 that includes a first write from a network health monitor circuit to a target over an internal network of the CGRP. The write can include a write request that sent over the request network of the internal network and write data sent over the data network of the internal network. The target may be a first health monitor register (HMR) in the interface configurable unit or a second HMR in the second external interface circuit. The write data may include a timestamp or sequence number. The method continues with waiting 705 for up to a timeout period to receive a response from the target at the network health monitor circuit. The response includes a response to the write over the response network of the internal network and may include a test response token sent over the request network of the internal network for some targets on the internal network.

In response to not receiving the responses from the target, or only receiving one of two expected responses from those targets who generate a test response token, during the timeout period, hang condition processing is performed 710. In some implementations, hang condition processing 710 may include sending 711 a force quit message to the interface configurable unit did not properly respond to the write that causes the interface configurable unit to stop execution of an application running on the array of configurable units. In some implementations, hang condition processing 710 may include sending 713 an interrupt to a host computer through the first external communication link. Hang condition processing 710 may also include filtering out 715 traffic received over the external interface and meant to be sent to the hung target on the internal network and/or setting one or more fields 717 in a hang syndrome CSR. The hang condition processing 710 may be done in response to detecting 719 a hang condition.

If the response is received within the timeout 705, the method continues with reading back 723 the data from the HMR. The read may include sending a read request over the request network of the internal network and then waiting 725 for up to a timeout period to receive a response in the form of read data back on the data network of the internal network. The read data is compared 727 to the write data and hang condition processing may be performed 710 in response to not receiving the read data within the timeout period or to the read data being different than the write data.

After writing/reading/comparing the data for a first HMR in a first agent, the method may include waiting 729 for a delay period after receiving the read data and then writing 703 another to the HMR of a next agent on the internal network. If the proper response if received within a timeout period then the HMR of that agent is read back and compared 727 to the what was written. Hang condition processing 710 may be performed if either the write or the read times out or if the data read is different from what is written. This may be repeated for some or all of the agents on the internal network.

In some implementations, the network health monitor circuit sends a write to the second external interface circuit over the internal network that includes metadata which indicates that the write should be forwarded to the HMR of another target on the internal network. The second external interface circuit then receives the write request, determines that it is to forwarded to the other target on the internal network based on metadata and forwards the write request and second write data to the other target to be written to its HMR. The second external interface circuit then forwards any write response and test response token received from the other target to the health monitor circuit over the appropriate portion of the internal network. The network health monitor circuit waits up to the timeout period to receive the response(s) forwarded by the second external interface circuit and in response to not receiving the expected response(s) during the timeout period, performs hang condition processing.

The method may also send a read request from the health monitor circuit to the second external interface circuit that includes metadata indicating that it should be forwarded to the HMR of the other target on the internal network. The read request is received at the second external interface circuit from the network health monitor circuit and forwarded to the HMR of the other target over the request network. Second read data is received at the second external interface circuit from the HMR of the other target and forwarded to the network health monitor circuit over the data network where it is compared to the second write data. Hang condition processing may be performed in response to a timeout of the read or the second read data being different than the second write data.

Figure 8:
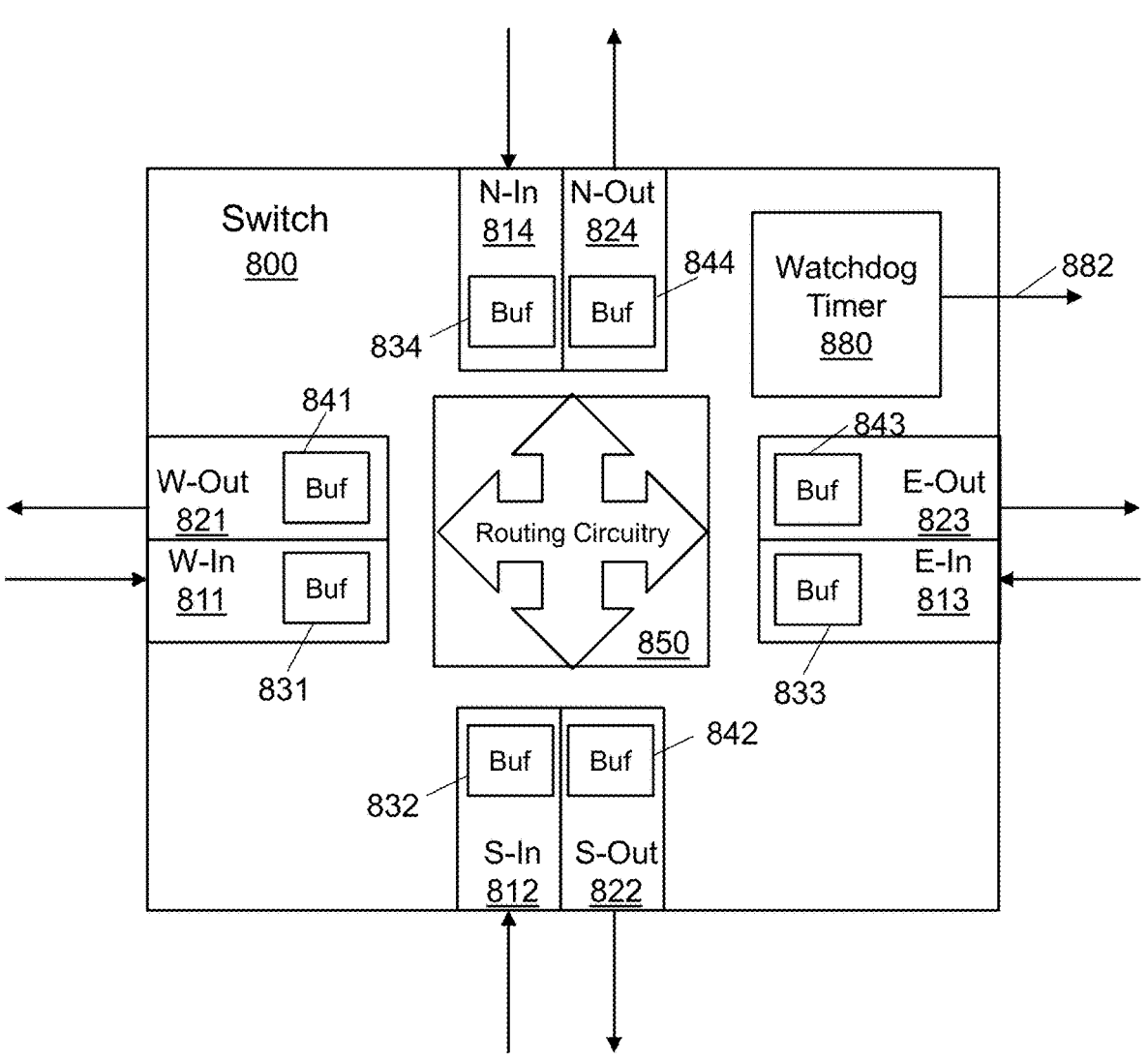
FIG. 8 shows a block diagram of an example implementation of a switch for use in an internal network of a CGRP that includes a watchdog timer.

FIG. 8 shows a block diagram of an example implementation of a switch 800 for use in an internal network of a CGRP that includes a watchdog timer 880. The switch 800 is suitable for use as any of the switches 511-532 in the request network 501 of the internal network 260 as shown in FIG. 5 as well as for any of the switches in the response network 502, the data network 503, or the credit network 504. While switch 800 is shown with 4 input ports, West-In 811, South-In 812, East-in 813, and North-In 814 and 4 output ports, West-Out 821, South-Out 822, East-Out 823, and North-Out 824, various implementations can have any number of input ports and any number of output ports. Each of the input ports 811-814 and/or output ports 821-824 may be associated with buffers 831-844 to allow packets to be stored in the switch 800 before being forwarded. Implementations may include buffers 831-834 associated with the input ports 811-814 but no buffers for the output ports 821-824, buffers 841-844 associated with the output ports 821-824 but no buffers for the input ports, or buffers 831-834 associated with the input ports 811-814 and buffers 841-844 associated with the output ports 821-824, depending on the implementation.

Each input port 811-814 has an input for receiving packet information from outside of the switch, as well as a hop-credit output as discussed earlier. It also has a connection to the routing circuitry 850 inside of the switch. Each output port 821-824 has an output for sending packet information outside of the switch, as well as a hop-credit input as discussed earlier. It also has a connection to the routing circuitry 850 inside of the switch. The routing circuitry 850 looks at information received with each packet at the input ports 811-814, determines to which output port 821-824 the packet should be sent, and then transfers the packet once there is room in the buffer of the appropriate output port to accept the packet.

Note that packets may be received and stored in buffers 831-844 in the switch 800 even though it is not known when, or if, the packet will be sent out of the switch due to the hop credits. If the network is congested, it is possible that packets could be held in the switch indefinitely, clogging the network. The watchdog timer 880 is used to monitor the amount of time that a packet is stored in the switch 800 and to send a timeout message to the network recovery circuit 234, indicating that a network failure has been detected. For the protocol of the TLN internal network 260, the watchdog timer 880 may only be needed for switches in the request network and the data network as destination agents of the response network and credit network are designed to always be able to accept new packets so those networks are not subject to persistent backup, although some implementations may include watchdog timers in switches of the response and credit networks to help detect hardware failures which could cause those networks to clog. Multiple sources targeting a single destination can cause backup in any network including credit and response networks, but because agents are designed to always be able to accept packets from the credit and response networks at their input ports, it is not possible to have persistent back pressure on these networks.

The watchdog timer 880 may be implemented in any fashion as it is not necessary that exact timing be kept for how long each packet is kept in each buffer 831-844. Some implementations may include a timer for each storage location in the buffers 831-844 which is set to a timeout value when a packet is written into that location and the timer started. The timer can be stopped when the packet is sent out of that location. If the timer expires, a timeout is detected and the watchdog timer may then send a timeout message to the network recovery circuit 234 on the internal network 260.

In another implementation, each port may have a timer that is running whenever anything is stored in its buffer and is reset to its initial value whenever a packet is sent out from the buffer. This implementation works well if the buffer is organized as a FIFO. In another implementation, the watchdog timer 880 may be tied to the hop credit counters in each output port and are reset when the hop credit counter is not equal to zero and allowed to run while the hop credit counter is equal to zero. Any implementation may be used for the watchdog timer to determine whether a packet has been stored in the switch 800 for too long.

The timeout message can be sent from the watchdog timer to the network recovery circuit 234 by any appropriate mechanism. In some implementations, the response network may be used to send the timeout message because the response network will not experience persistent backup and hang. The credit network could be alternatively used. In other implementations, a strobe signal may be sent on a dedicated connection 882 between each switch and the network recovery circuit or on a shared connection. In yet another implementation, a daisy-chained signal may be passed from one switch to the next and on to the network recovery circuit with each switch passing on a timeout message it receives as well as allowing it to send its own timeout message.

Thus, the switch 800 includes a plurality of ports 811-824 and a plurality of buffers 831-844 associated with respective ports of the plurality of ports 811-824 to store input packets received through input ports 811-814 the plurality of ports

811-824. The switch 800 also includes routing circuitry 850 coupled to the plurality of buffers 831-844 and configured to send the input packets stored in the plurality of buffers 831-844 to respective output ports 821-824 of the plurality of ports 831-844 based on their respective destinations. The switch 800 also includes a watchdog timer 880 configured to determine that a packet of the input packets has been stored in the plurality of buffers 811-844 for longer than a timeout period without being sent and send a timeout message to the network recovery circuit 234 in response. The network recovery circuit 234 may take various actions in response to receiving the timeout message, such as, but not limited to, interrupting a host computer 225, sending a force-quit message to stop execution of at least a portion of the processor, and/or setting one or more fields in a hang syndrome CSR 670.

Figure 9:
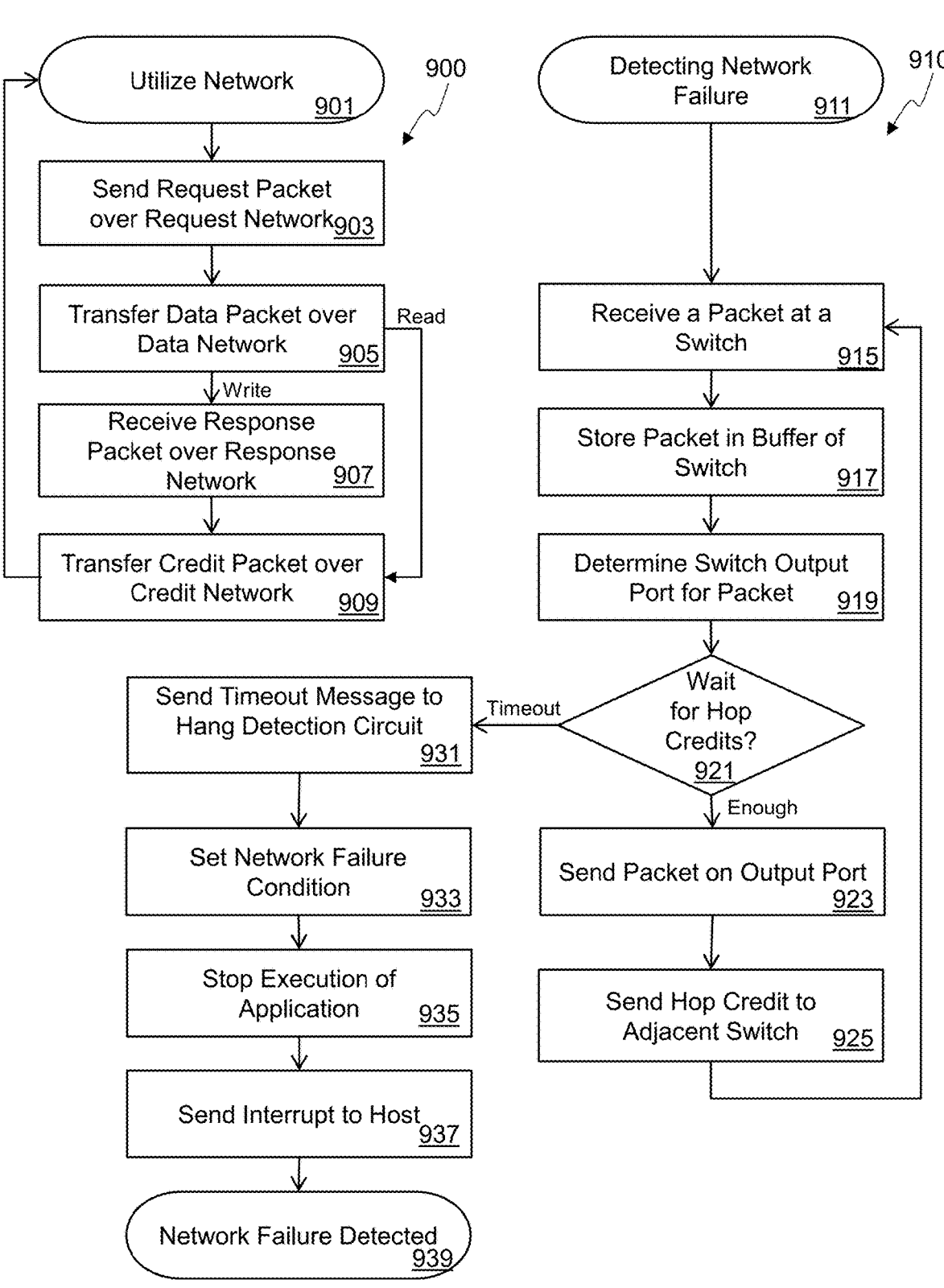
FIG. 9 shows two flowcharts implementing an example of a method for detecting a network failure in an internal network using switches.

FIG. 9 shows two flowcharts 900, 910 implementing an example method for detecting a network failure in an internal network using a plurality of switches. Flowchart 900 shows utilizing 901 the network. A request packet is sent 903 by a first agent to a second agent on a request network of the internal network. The request packet moves through one or more request switches of the plurality of switches. A response packet is received 905 on a response network of the internal network by the first agent from the second agent. The response packet moves through one or more response switches of the plurality of switches. A data packet is then transferred 907 over a data network of the internal network between the first agent and the second agent. The direction of the data packet through the data network depends on whether the data packet is in response to write request or a read request. The data packet moves through one or more data switches of the plurality of switches. A credit packet is transferred 909 over a credit network of the internal network between the first agent and the second agent. The credit packet moves through one or more credit switches of the plurality of switches. The flowchart 900 can be repeated in whole or in part as many times as necessary during execution of an application in a processor that includes the internal network.

Flowchart 910 shows detecting 911 a network failure. Hop credit counters may have been initialized to show that inputs are able to accept packets from adjacent switches. A packet is received 915 at an input of a switch. The packet may be a request packet, a response packet, a data packet, or a credit packet. The packet is stored 917 in a buffer in the switch and a determination 919 is made as to which output port of the switch the packet should be sent, based on a header of the packet. The packet is held in the buffer, waiting 921 until enough hop credits are accumulated for the output port, based on hop credits previously received by the output port from on input port of an adjacent switch to which is it attached, to accommodate the packet before sending 923 the packet through the output port. Once the packet has been dequeued from its buffer and sent out of the appropriate output port, a hop credit is sent 925 to the output port of the adjacent switch which provided the packet to the input of the switch.

An amount of time that the packet is held in the buffer before it is sent on the output port is monitored 921 and in response to the packet being held in the buffer for longer than a timeout period, a timeout message is sent 931 to a network recovery circuit. In some implementations, the timeout message may be sent from the switch to the network recovery circuit over the internal network. The response network may be used in some implementations.

Actions may be taken in response to receiving the timeout message, such as, but not limited to, setting 933 a network failure condition in the network recovery circuit, setting one or more fields in a hang syndrome CSR, stopping execution of an application 935 using the internal network, and/or sending 937 an interrupt to a host computer through an external communication link. Thus, a network failure is detected 939 in response to receiving a timeout message.

Figure 10:
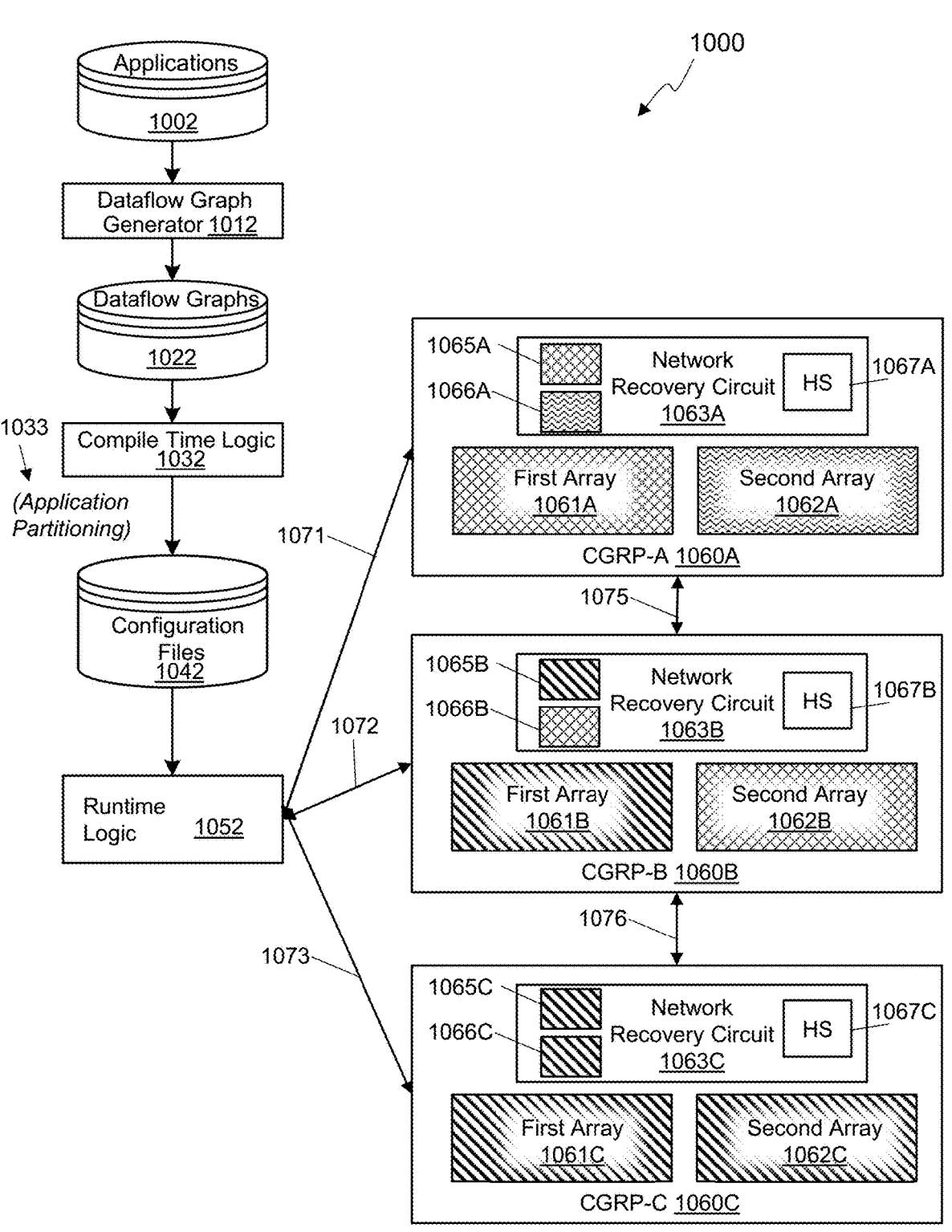
FIG. 10 shows an example computing system with multiple applications distributed across multiple CGRPs.

FIG. 10 shows a system 1000 with multiple applications 102 distributed across multiple coarse-grained reconfigurable architecture processors (CGRPs) 1060A, 1060B, 1060C. This system may be similar to the system 200 shown in FIG. 2 but showing different details. For the purposes of this discussion, the internal architecture of CGRP-A 1060A, CGRP-B 1060B, and CGRP-C 1060C can be assumed to be identical, although some implementations may have differences such as differing numbers and configurations of arrays of configurable units and different numbers and types of interfaces to external resources. Runtime logic 1052 runs on a host computer that can communicate with CGRP-A 1060A over communication link 1071, CGRP-B over communication link 1072, and CGRP-C over communication link 1073. Dataflow graph generator 1012 and compile time logic 1032 may run on the same host computer as the runtime logic 1052 or on one or more other computers, depending on the implementation. The Applications 1002, Dataflow graphs 1022, and configuration files 1042 may be stored on any suitable computer storage medium accessible to the computers that use those resources.

CGRP-A 1060A includes a first array of configurable units 1061A and a second array of configurable units 1062A as well as external interfaces (not shown but similar to I/O Interfaces 230, 241, 243) and a network recovery unit 1063A that are all coupled together through an internal network (not shown but similar to network 260 of FIG. 2). The external interfaces are each coupled between the internal network and a respective external communication link 1071, 1075. The network recovery unit 1063A includes an application ID CSR with a first field 1065A associated with the first array 1061A and a second field 1066B associated with the second array 1062A, and a hang syndrome CSR 1067A that has fields to tell which arrays of CGRP-A 1060A may be hung or may have been sent a force-quit message. The network recovery unit 1063A may be integrated into one of the external interfaces in some implementations.

CGRP-B 1060B includes a first array of configurable units 1061B and a second array of configurable units 1062B as well as external interfaces (not shown but similar to I/O Interfaces 230, 241, 243) and a network recovery unit 1063B that are all coupled together through an internal network (not shown but similar to network 260 of FIG. 2). The external interfaces are each coupled between the internal network and a respective external communication link 1072, 1075, 1076. The network recovery unit 1063B includes an application ID CSR with a first field 1065B associated with the first array 1061B and a second field 1066B associated with the second array 1062B, and a hang syndrome CSR 1067B that has fields to tell which arrays of CGRP-B 1060B may be hung or may have been sent a force-quit message. The network recovery unit 1063B may be integrated into one of the external interfaces in some implementations.

CGRP-C 1060C includes a first array of configurable units 1061C and a second array of configurable units 1062C as well as external interfaces (not shown but similar to I/O Interfaces 230, 241, 243) and a network recovery unit 1063C that are all coupled together through an internal network (not shown but similar to network 260 of FIG. 2). The external interfaces are each coupled between the internal network and a respective external communication link 1073, 1076. The network recovery unit 1063C includes an application ID CSR with a first field 1065C associated with the first array 1061C and a second field 1066C associated with the second array 1062C, and a hang syndrome CSR 1067C that has fields to tell which arrays of CGRP-C 1060C may be hung or may have been sent a force-quit message. The network recovery unit 1063C may be integrated into one of the external interfaces in some implementations.

Multiple applications 1002 that may run independently or only loosely coupled with each other may be processed by the dataflow graph generator 1012 to generate dataflow graphs 1022. Each application 1002 may be used to generate one or more dataflow graphs 1022. The dataflow graphs 1022 are then compiled by compile time logic 1032 that includes a compiler to generate configuration files 1042. During the process of transforming the applications 1002 to configuration files 1042, the applications are partitioned 1033 into portions that can run on a single array of configurable units (e.g., 1061A, 1062A, 1061B, 1062B, 1061C, 1062). The partitioning 1033 may be done by the dataflow graph generator 1012, the compiler 1032, by the runtime logic 1052, or by a dedicated software utility that is included in the system 1000, depending on the implementation. An application may be able to run on a single array or may utilize multiple arrays. The configuration files 1042 may be partitioned so that a single configuration file is used for a single array, but multiple configuration files may be used to configure a single array in some cases.

The runtime logic 1052 can determine which configuration files 1042 are associated with which applications 1002 and load them into an appropriate array of configurable units. In some implementations, the compiler 1032 may determine into which array each configuration file is to be loaded. In other implementations, the runtime logic 1052 may determine at runtime where to load the configuration files. In the example shown, a first application is compiled into a first set of configuration files to utilize three arrays, a second application is compiled into a second set of configuration files to utilize two arrays, and a third application is compiled into a third set of configuration files for a single array.

The runtime logic 1052 can access the configuration files 1042 and load them into appropriate arrays of configurable unit in CGRPs. The runtime logic 1052 may follow instructions created by the compiler 1032 and/or may determine at runtime which arrays to use, making appropriate modifications to the configuration files as necessary to fit the exact physical configuration. The runtime logic 1052 may utilize any technique to determine which arrays to use, including simply selecting them from an ordered list of available arrays, randomly selecting arrays to use from an available pool, or choosing arrays based on physical proximity to other arrays used for the application of an associated application.

In the example shown, the runtime logic 1052 loads the first set of configuration files associated with the first application into the first array 1061C of CGRP-C 1060C, the second array 1062C of CGRP-C, and the first array 1061B of CGRP-B 1060B. It then loads the fields of the application ID CSRs associated with those arrays with an identifier of the first application, so the first array field 1065C and second array field 1066C of the application ID CSR of CGRP-C 1060C is loaded with an identifier of the first application and the same identifier is also loaded into the first array field 1065B of the application ID CSR of CGRP-B 1060B. This is noted in FIG. 10 by the sloped line hatching in the arrays 1061C, 1062C, 1061B assigned to the first application as well as the associated fields 1065C, 1066C, 1065B in the application ID CSRs.

The runtime logic 1052 loads the second set of configuration files associated with the second application into the second array 1062B of CGRP-B 1060B and the first array 1061A of CGRP-A 1060A. It then loads the fields of the application ID CSRs associated with those arrays with an identifier of the second application, so the second array field 1066B of CGRP-B 1060B and first array field 1065A of the application ID CSR of CGRP-A 1060A is loaded with an identifier of the second application. This is noted in FIG. 10 by the cross-hatching in the arrays 1062B, 1061A assigned to the second application as well as the associated fields 1066B, 1065A in the application ID CSRs.

The runtime logic 1052 loads the third set of configuration files associated with the third application into the second array 1062A of CGRP-A 1060A and then loads the second array field 1066A of the application ID CSR of CGRP-A 1060A with an identifier of the third application. This is noted in FIG. 10 by the wavy-line hatching in the array 1062A the associated field 1066A in the application ID CSRs.

Each of the arrays 1061A, 1062A, 1061B, 1062B, 1061C, 1062C can include a hang detection circuit as shown in FIG. 3 which includes a force-quit controller that can used to halt execution within its array. In addition, the network recovery circuits 1063A, 1063B, 1063C each include network recovery logic, and a force-quit detector as shown in FIG. 6. The hang detection circuit in each array 1061A, 1062A, 1061B, 1062B, 1061C, 1062C is configured to detect when the application it is executing has hung. This may be done as shown in FIG. 4 or may be done using some other technique.

The network recovery circuits 1063A, 1063B, 1063C can receive a hang message from a hang detection circuit in its CGRP over the internal network or by some other communication connection and send a first force-quit message to that force-quit controller to halt execution by that array of configurable units. It can then compare the value of the associated application ID field to values of other application ID fields and send a force-quit message to the force-quit controllers associated with those arrays if the values match. The force-quit controller also empties buffers in its array of configurable units related to the internal network and allows any outstanding transactions on the internal network involving its array of configurable units to complete in response to receiving the force-quit message.

So as a specific non-limiting example, if the first array 1061C hangs during execution of its portion of the first application, the hang detection circuit in array 1061C sends a hang message to the network recovery circuit 1063C which responds by sending a force-quit message to the force-quit controller of first array 1061C which stops execution of its portion of the first application in the first array 1061C. The network recovery circuit 1063C then compares the value stored in the first application ID field 1065C to the value stored in the second application ID field 1066C. Since those two values match in this example signifying that they are running parts of the same application, the network recovery circuit 1063C sends a second force-quit message to the force-quit controller of the second array 1062C which stops execution of its portion of the first application in the second array 1062C. In addition, the network recovery circuit 1063C may also send an interrupt to a host computer, which may be executing the runtime logic 1052, and set the one or more hang syndrome registers 1067C to indicate which arrays are hung and/or have been sent a force-quit message. The hang syndrome registers 1067A, 1067B, 1067C may be accessible by the runtime logic 1052 to determine which arrays have been stopped using a force-quit message.

The runtime logic 1052, in response to receiving the interrupt from CGRP-C 1060C, determines that at least the first array 1061C is hung. It may do this by reading the hang syndrome register 1067C in CGPR-C 1060C, or the information may be conveyed with the interrupt, depending on the implementation. The runtime logic 1052 then determines that the first application was running in the first array 1061C of CGRP-C 1060C and then determines whether any other arrays were also assigned to the first application. This can be accomplished by accessing information maintained by the runtime logic or by reading the application ID fields of other CGRPs in the system. In this example, the runtime logic 1052 determines that both the second array 1062C of CGRP-C 1060C and the first array 1061B of CGRP-B 1060B were also assigned to the first application and the runtime logic 1052 can then ensure that those arrays are also halted. While in some implementations, other arrays in the same CGRP as the hung array may be automatically stopped if they are running the application which hung, such as the second array 1062C in CGRP-C 1060C, runtime logic 1052 sends a force-quit command for the first array 1061B of CGRP-B 1060B, resulting in a force-quit message being sent to the force-quit controller in the first array 1062B. In some implementations, it may also send a force-quit command to the second array 1062C in CGRP-C 1060C, resulting in a force-quit message being sent to the force-quit controller in the second array 1062C. This allows all arrays that are running an application that has a portion that has hung to be stopped.

In some implementations, an agent in one CGRP can communicate to an agent in another CGRP through the external communication links 1075-1076 without involvement from the host computer. This may be referred to a as peer-to-peer communication and is described in more detail in US patent publications US 2024/0020261 entitled "PEER-TO-PEER ROUTE THROUGH IN A RECONFIG-URABLE COMPUTING SYSTEM" and US 2024/0073129 entitled "PEER-TO-PEER COMMUNICATION BETWEEN RECONFIGURABLE DATAFLOW UNITS," both of which are a part of this disclosure. So for example, a configurable unit in the second array 1062B of CGRP-B 1060B may be configured to read data from an external memory coupled to CGRP-A 1060A. Depending on the implementation, a remote read request may be sent from the interface configurable unit in the second array 1062B over the internal network of CGRP-B 1060B to an external interface of CGRP-B 1060B, through external communication link 1075 to an interface circuit of CGRP-A 1060A, and across the internal network of CGRP-A 1060A to a memory controller of CGRP-A 1060A for processing. Several remote read commands may be queued in the memory controller resulting in many read data packets being returned from the memory controller in CGRP-A 1060A back to the second array 1062B in CGRP-B 1060B via the reverse path. If the second array 1062B of CGRP-B 1060B hangs for some reason before it receives all of the requested read data, the read packets could back up and clog the internal network of CGRP-B 1060B and maybe even the internal network of CGRP-A 1060A.

To mitigate this issue, the external interface circuit, or the network recovery circuit 1063B in the external interface circuit, looks at a destination of a packet received on an external interface through a communication links 1072, 1075, 1076 and checks to see if the destination is on the internal network is hung. It may do this for the arrays 1061B, 1062B by looking at the hang syndrome CSR 1067C. If the destination is hung, the packet is discarded without forwarding it to its destination. As long as the destination is not shown as being hung, the packet is sent across the internal network to its destination.

As described above, in one example case, the external interface circuit receives a packet over the external communication link that includes information indicating a destination agent on the internal network for the packet. In response to determining that the destination agent is associated with the first array of configurable units and that one or more hang syndrome registers does not indicate that the first array of configurable units is hung, it sends the packet over the internal network to the destination agent. Similarly, in response to determining that the destination agent is associated with the second array of configurable units and that one or more hang syndrome registers does not indicate that the second array of configurable units is hung, it sends the packet over the internal network to the destination agent. Conversely, in response to determining that the destination agent is associated with the first array of configurable units and that one or more hang syndrome registers indicates that the first array of configurable units is hung or that the destination agent is associated with the second array of configurable units and that one or more hang syndrome registers indicates that the second array of configurable units is hung, the external interface circuit discards the packet.

In some cases, the network recovery circuit may communicate with a network health monitor or other self-test circuit to detect whether the internal network is hung and generate a network failure condition in response. The first external interface circuit may then set the one or more hang syndrome registers to indicate that both the first array of configurable units and the second array of configurable units are hung in response to the network failure condition. In addition to setting hung bits for each array, or as an alternative to that, a separate field may be included in the hang syndrome registers to indicate that the internal network is hung. If the internal network itself is hung, the external interface may discard any packet received through its external communication interface that is destined for another agent on the internal network, to avoid congestion backing up into other CGRPs.

Figure 11A:
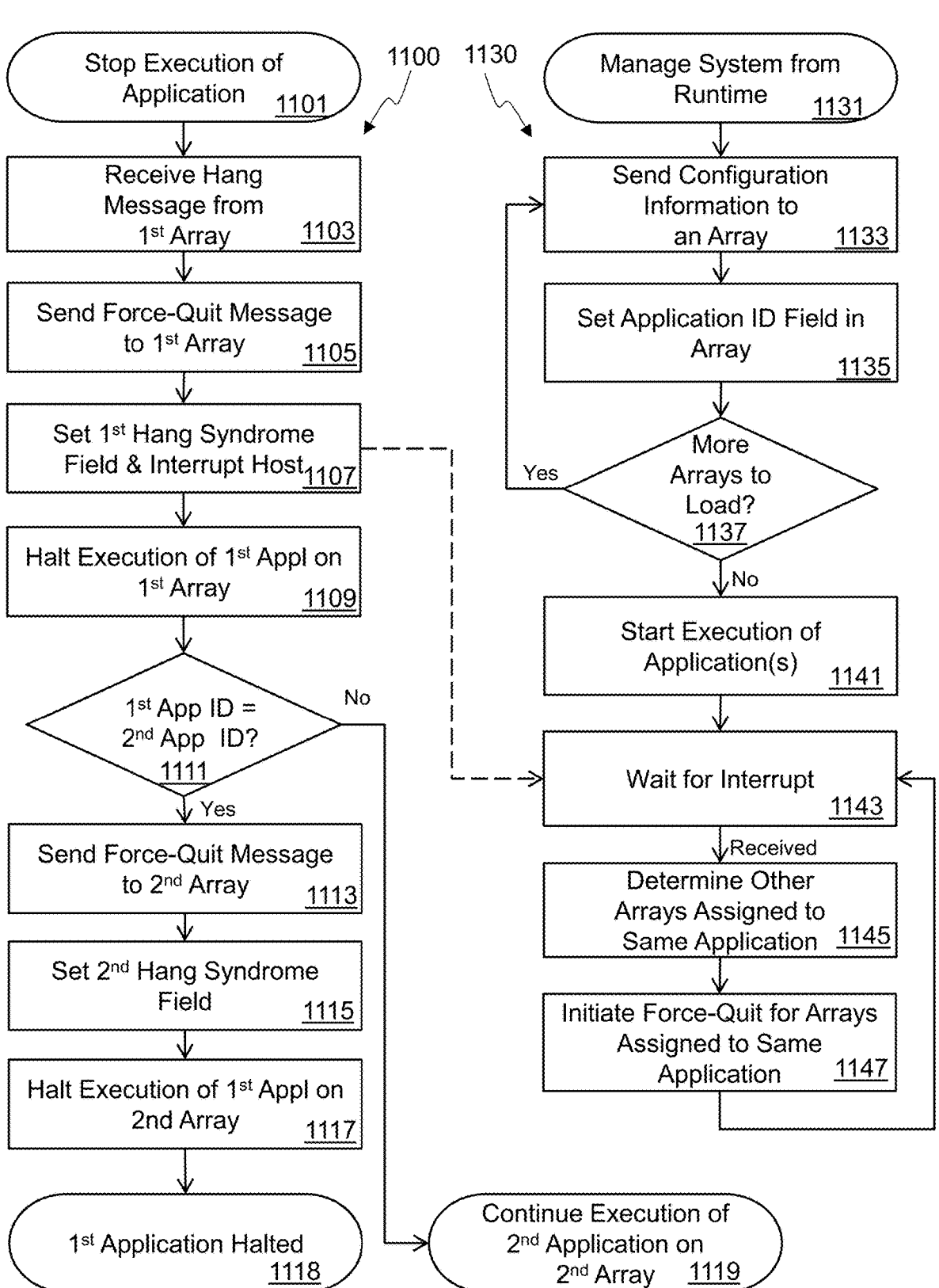
FIGS. 11A and 11B show three flowcharts implementing example methods for managing failures within a reconfigurable processor.
Figure 11B:
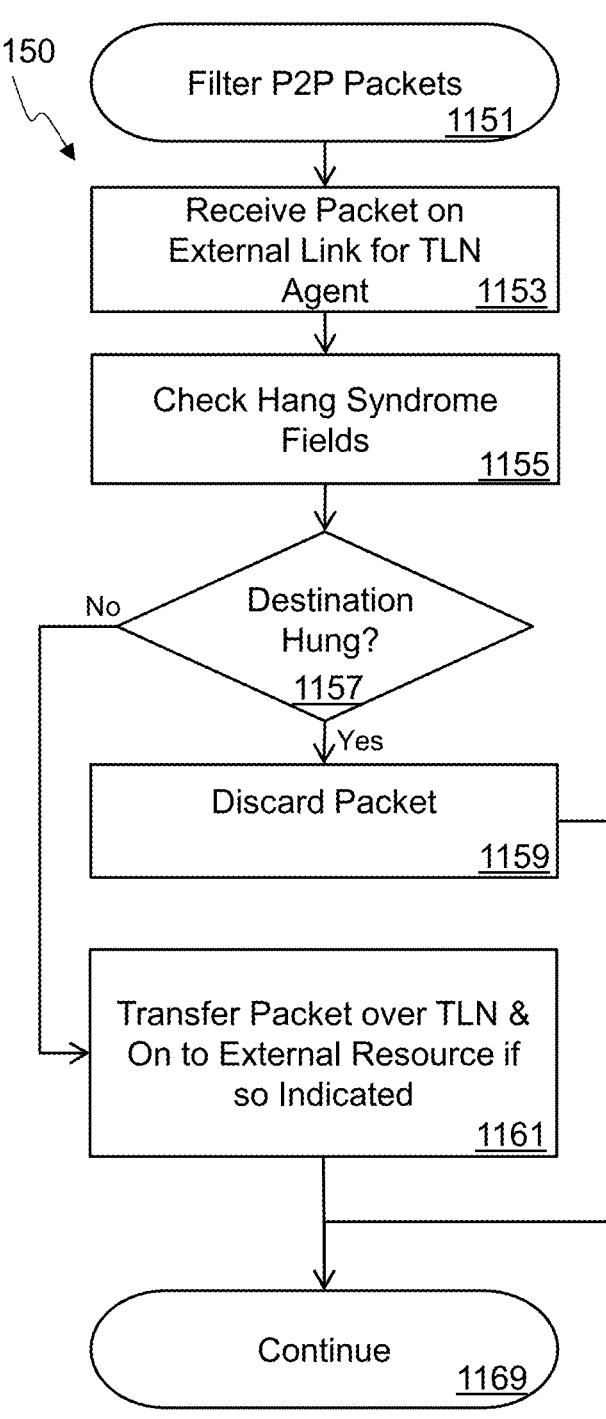

FIGS. 11A and 11B show three flowcharts 1100, 1130 1150 implementing an example method of recovering from a failure while executing an application within a reconfigurable processor. Flowchart 1130 shows action by the runtime logic on a host computer to manage 1131 the system. To set up the system to execute the application, a host computer sends 1133 first configuration information for a first portion of a first application from to the first array of configurable units in the reconfigurable processor and sets 1135 the first application ID field in the reconfigurable processor to a value indicative of the first application. The runtime determines that there are more arrays to load 1137. The host computer also sends 1133 second configuration information for a second portion of the first application from the host computer to the second array of configurable units in the reconfigurable processor and sets 1135 the second application ID field in the reconfigurable processor to the value indicative of the first application. If the application is assigned 1137 more resources, the host computer may send 1133 third configuration information for a third portion of the first application from the host computer to a first array of configurable units in a second reconfigurable processor and set 1135 the first application ID field in the second reconfigurable processor to the value indicative of the first application.

Once the runtime has determined that there are no more arrays to load for the first application, the host computer can then initiate execution 1141 of the first application using the first array of configurable units and the second array of configurable units in the reconfigurable processor and, if used in the first application, the first array of configurable units in the second reconfigurable processor. In some implementations, individual arrays may begin execution of their portion of the first application before all of the other arrays used by the first application have been loaded with their configuration information. In some cases, a second application may execute concurrently with the first application, and the host computer may send 1133 fourth configuration information for a portion of a second application from the host computer to a second array of configurable units in the second reconfigurable processor and set 1135 a second application ID field in the second reconfigurable processor to a value indicative of the second application. The host computer may then initiate 1141 execution of the second application using the second array of configurable units in the second reconfigurable processor. While the application (s) are running on the arrays of configurable units, the runtime logic may perform various tasks but may wait 1143 for an interrupt to indicate that one of the arrays has hung.

Flowchart 1100 shows a method of stopping 1101 execution of an application running on multiple arrays of one or more CGRPs. The method includes receiving 1103 a hang message at a network recovery circuit in the reconfigurable processor from a first hang detection circuit associated with the first array of configurable units of the reconfigurable processor. The hang message may be a message sent over the internal network, communication over a set of shared wires, point-to-point communication between the network recovery circuit and each array of configurable units, or any type of suitable communication mechanism. The network recovery circuit then sends 1105 a first force-quit message to a first force-quit controller associated with the first array of configurable units. The force-quit message may be a message sent over the internal network, communication over a set of shared wires, point-to-point communication between the network recovery circuit and each array of configurable units, or any type of suitable communication mechanism. A first hang syndrome field in one or more CSRs in the CGRP is also set 1107 to indicate that the first array of configurable units is hung in conjunction with sending the first force-quit message. The first force-quit controller then halts 1109 execution of a first application running on the first array of configurable units in response to receiving the first force-quit message. The first force-quit controller may also empty buffers in the first array of configurable units related to the internal network to allow any outstanding transactions involving the first array of configurable units to complete in response to the first force-quit controller receiving the first force-quit message.

A first value of a first application ID field in the one or more CSRs is compared 1111 to a second value of a second application ID field in the one or more CSRs. The first and second application ID fields were set by the runtime logic when the configuration files were sent to CGRP to indicate which applications are using the first array of configurable units and the second array of configurable units. If the values of the first and second application ID are different, indicating that a second application is running on the second array, the second application is allowed to continue execution 1119 on the second array.

If, however, the values of the first and second application ID are the same indicating that both the first array of configurable units and the second array of configurable units are assigned to the first application, a second force-quit message is sent 1113 to a second force-quit controller associated with the second array of configurable units and a second hang syndrome field is set 1115 in the one or more CSRs to indicate that the second array of configurable units is hung. The second force-quit controller the halts 1117 execution of the first application running on the second array of configurable units which halts 1118 the execution of the first application on the CGRP. The portions of the flowchart 1100 starting with comparing the application IDs 1111 through halting 1118 the application or continuing execution 1119 may be repeated for other arrays of configurable units in the CGRP.

In some implementations, the first reconfigurable processor sends 1107 an interrupt to the host computer to indicate that the first array of configurable units in the first reconfigurable processor is hung. As shown in flowchart 1130, the host computer, which is waiting 1143 for the interrupt, then determines 1145 one or more other arrays of configurable units that are assigned to the first application. This can be done by consulting information that was created during the partitioning of the application into portions to run on particular arrays or by the runtime when the portions of the application were assigned to arrays. In some implementations, the host computer may read application ID CSRs in the reconfigurable processors in the system to determine which arrays are running the first application. In this example, the first array of configurable units in the second reconfigurable processor is included in the set of arrays that are assigned to the first application.

A command is then sent 1147 from the host computer to the second reconfigurable processor to send a force-quit message to a first force-quit controller associated with the first array of configurable units in the second reconfigurable processor. The first force-quit controller in the second reconfigurable processor then halts the execution of the first application running on the first array of configurable units of the second reconfigurable processor.

Flowchart 1150 shows a method of filtering packets 1151 that were destined for a hung array of configurable units. A packet is received 1153 over the external communication link at the external interface circuit and temporarily stored in a buffer. The packet includes information indicating a destination agent on the internal network for the packet (e.g., a destination ID). The hang syndrome fields in the reconfigurable processor are checked 1155 to see if the destination agent is hung. If the destination agent is hung 1157, the packet is discarded 1159, meaning that the buffer is adjusted to indicate that the space used for the packet is not valid and is empty and available for use to store another packet as the reconfigurable processor continues 1169. If, however the destination agent is not hung 1157, the packet is sent 1161 over the internal network to the destination agent which may then take action with another resource, such as an external memory, an external communication link, or a configurable unit in an array of configurable units. The reconfigurable processor may then continue 1169 with other operations. In some implementations, the hang syndrome fields may include a separate field to indicate that the internal network is hung. In those implementations, the hung network field may be interpreted to indicate that all agents on the internal network are hung, and all packets destined for any other agent on the internal network should be discarded.

Particular Implementations

The following paragraphs provide nonlimiting examples of the disclosure provided herein.

Example A1. A reconfigurable processor, comprising: an array of configurable units configurable to execute an application instrumented with at least one progress milestone; a control bus coupled to configurable units in the array of configurable units; and a hang detection circuit coupled to the control bus and including a timer that resets in response to receiving a control signal via the control bus; wherein a configurable unit in the array of configurable units sends the control signal, in response to completion of a progress milestone in the at least one progress milestone, to the hang detection circuit via the control bus; and the hang detection circuit detects a hang condition in the execution of the application based on an expiration of the timer.

Example A2. The reconfigurable processor of example A1, the hang detection circuit further comprising: a second timer that resets in response to receiving a second control signal via the control bus that indicates completion of a second progress milestone in the at least one progress milestone; wherein the hang detection circuit also detects the hang condition based on an expiration of either the timer or the second timer.

Example A3. The reconfigurable processor of example A1, the hang detection circuit further comprising: a second timer that resets in response to receiving a second control signal via the control bus that indicates completion of a second progress milestone in the at least one progress milestone; wherein the hang detection circuit detects the hang condition based on an expiration of both the timer and the second timer.

Example A4. The reconfigurable processor of example A1, wherein the timer also resets in response to receiving a second control signal via the control bus that indicates completion of a second progress milestone in the at least one progress milestone.

Example A5. The reconfigurable processor of any of examples A1 through A4, the array of configurable units coupled to an interface unit that includes the hang detection circuit.

Example A6. The reconfigurable processor of any of examples A1 through A5, the hang detection circuit further comprising a force-quit controller that stops execution of the application on the array of configurable units in response to detecting the hang condition.

Example A7. The reconfigurable processor of any of examples A1 through A6, wherein compile time logic is configured to instrument the application with the at least one progress milestone.

Example A8. The reconfigurable processor of example A7, wherein the compile time logic is further configured to define a timer value for the timer.

Example A9. The reconfigurable processor of example A8, wherein the compile time logic is further configured to define a second timer value for a second timer in the hang detection circuit that is reset by a second control signal sent in response to completion of a second progress milestone in the at least one progress milestone, to the hang detection circuit via the control bus.

Example A10. The reconfigurable processor of any of examples A1 through A9, further comprising: an external interface circuit coupled to a host computer through an external communication link; an internal network coupled to the external interface circuit; and an internal interface circuit coupled to the internal network and the control bus, the internal interface circuit including the hang detection circuit; wherein the hang detection circuit further sends a hang message to the external interface circuit over the internal network in response to detecting the hang condition.

Example A11. The reconfigurable processor of example A10, the external interface circuit further including a network recovery circuit that receives the hang message and sends an interrupt to the host computer through the external communication link in response.

Example A12. The reconfigurable processor of any of examples A10 through A11, the internal interface circuit further including a force-quit controller, wherein the external interface circuit sends a force quit message to the force-quit controller over the internal network in response to receiving the hang message, wherein the force-quit controller stops execution of the application on the array of configurable units in response to receiving the hang message.

Example A13. The reconfigurable processor of any of examples A10 through A12, wherein internal network comprises a non-blocking dimensionally-routed mesh network.

Example A14. A method for detecting an application that has hung during execution in an array of configurable units having a control bus, the method comprising: setting a timer in a hang detection circuit to a timeout value, the hang detection circuit coupled to the control bus; in response to encountering a progress milestone during execution of the application in the array of configurable units, sending a control signal via a control bus from a configurable unit in the array of configurable units to the hang detection circuit; resetting the timer in response to receiving the control signal via the control bus; and in response to the timer expiring, detecting a hang condition.

Example A15. The method of example A14, further comprising stopping execution of the application on the array of configurable units in response to detecting the hang condition.

Example A16. The method of any of examples A14 through A15, further comprising: receiving a dataflow graph application for compilation; inserting the progress milestone into the dataflow graph application to generate an instrumented dataflow graph application; compiling the instrumented dataflow graph application to generate a configuration file; and loading the configuration file into the array of configurable units and initiate execution of the instrumented dataflow graph application as the application.

Example A17. The method of any of examples A14 through A16, further comprising: determining a value for the timer based on an expected time between times that the progress milestone is to be encountered during execution of the application; and initiating the timer with the value.

Example A18. The method of any of examples A14 through A17, further comprising sending a hang message to an external interface circuit over an internal network coupling the array of configurable units to the external interface circuit in response to detecting the hang condition.

Example A19. The method of example A18, further comprising sending an interrupt from the external interface circuit to a host computer through an external communication link in response to receiving the hang message.

Example A20. The method of any of examples A18 through A19, further comprising: sending a force quit message to a force-quit controller over the internal network in response to receiving the hang message; and stopping execution of the application on the array of configurable units in response to receiving the force quit message.

Example A21. A computing system comprising: a host computer; an external communication link; a coarse-grained reconfigurable architecture processor that includes: an external interface circuit coupled to the host computer through the external communication link; an internal network coupled to the external interface circuit; an array of configurable units configurable to execute an application instrumented with at least one progress milestone; a control bus coupled to configurable units in the array of configurable units; an internal interface circuit coupled to the internal network and the control bus, the internal interface circuit including hang detection circuit with a timer that resets in response to receiving a control signal via the control bus; wherein a configurable unit in the array of configurable units sends the control signal, in response to completion of a progress milestone of the at least one progress milestone, to the hang detection circuit via the control bus; and the hang detection circuit detects a hang condition in the execution of the application based on an expiration of the timer.

Example A22. The computing system of example A21, wherein the hang detection circuit sends a hang message to the external interface circuit over the internal network in response to detecting the hang condition.

Example A23. The computing system of example A22, wherein the external interface circuit sends an interrupt to the host computer through the external communication link in response to receiving the hang message.

Example A24. The computing system of any of examples A22 through A23, the internal interface circuit further including a force-quit controller, wherein the external interface circuit sends a force quit message to the force-quit controller over the internal network in response to receiving the hang message, wherein the force-quit controller stops execution of the application on the array of configurable units in response to receiving the hang message.

Example B1. A computing system comprising: a plurality of external communication links including a first external communication link and a second external communication link; a host computer coupled to the first external communication link; an external device coupled to the second external communication link; a CGRP (coarse-grained reconfigurable processor), coupled to both the first external communication link and the second external communication link, the CGRP comprising: an internal network comprising a request network, a response network, and a data network that operate concurrently, wherein a network protocol for the internal network includes a response packet sent over the response network in response to a request sent over the request network; a first external interface circuit coupled between the internal network and the first external communication link, and including a network health monitor circuit; a second external interface circuit coupled to the external device through the second external communication link, the second external interface circuit including a second health monitor register; and an array of configurable units including an interface configurable unit coupled to the internal network and compliant with the network protocol for the internal network, wherein the interface configurable unit includes a first health monitor register and is configurable to enable communication of application data between a configurable unit in array of configurable units and the external device through the second external interface circuit and over the internal network, the interface configurable unit further configured to send a test response token over the request network in addition to the response packet on the response network in response to a write to the first health monitor register; the network health monitor circuit configured to: send a first write request to the first health monitor register over the request network and first write data to the first health monitor register over the data network; wait for up to a timeout period to receive both a write response packet over the response network and a test response token over the request network from the interface configurable unit; in response to not receiving both the write response packet and the test response token from the interface configurable unit during the timeout period: detect a network failure condition; and in response to receiving both the write response packet and the test response token from the interface configurable unit during the timeout period: send data first read request to the first health monitor register over the request network without sending a response to the test response token over the response network; receive first read data from the first health monitor register over the data network; compare the first read data to the first write data; detect the network failure condition in response to the first read data being different than the first write data; wait for a delay period after the first read data is received; send a second write request over the request network and second write data over the data network to the second health monitor register; send a second read request to the second health monitor register over the request network; receive second read data from the second health monitor register over the data network; compare the second read data to the second write data; and detect the network failure condition in response to the second read data being different than the second write data.

Example B2. The computing system of example B1, the first external interface circuit configured to, in response to the detection of the network failure condition: send an interrupt to the host computer through the first external communication link; set an indication of the network failure condition in a status register in the first external communication link; and send a force quit message to the interface configurable unit that causes the interface configurable unit to stop execution of an application running on the array of configurable units.

Example B3. A reconfigurable processor, comprising: an internal network that includes a request network, a response network, and a data network that operate concurrently, wherein a network protocol for the internal network includes a response packet sent over the response network in response to a write request sent over the request network; a first external interface circuit, coupled between the internal network and a first external communication link; an array of configurable units including an interface configurable unit, that has a first health monitor register, coupled to the internal network and compliant with the network protocol for the internal network, wherein the interface configurable unit is configurable to enable communication of application data between a configurable unit in array of configurable units and another device over the internal network, the interface configurable unit further configured to send a test response token over the request network in addition to the response packet on the response network in response to a write request to the first health monitor register; a second external interface circuit, including a second health monitor register, and coupled between the internal network and a second external communication link; and a network health monitor circuit coupled to the internal network and configured to: send a first write request to a target over the request network and first write data to the target over the data network, wherein the target comprises the first health monitor register in the interface configurable unit or the second health monitor register in the second external interface circuit; wait for up to a timeout period to receive a reply from the target; and in response to not receiving the reply from the target during the timeout period, detect a network failure condition.

Example B4. The reconfigurable processor of examples B3, wherein the first write data includes a timestamp or sequence number.

Example B5. The reconfigurable processor of example B3, wherein the second external communication link comprises a PCIe (Peripheral Component Interconnect Express) link or an Ethernet link.

Example B6. The reconfigurable processor of any of examples B3 through B5, the network health monitor circuit further configured to: send a first read request to the target over the request network; and wait for up to the timeout period to receive first read data from the target over the data network, compare the first read data to the first write data, and detect the network failure condition in response to the first read data being different than the first write data or not receiving the first read data within the timeout period.

Example B7. The reconfigurable processor of any of examples B3 through B6, wherein the internal network further comprises a credit network, the request network, the response network, the data network and the credit network each comprise a switched mesh network that are designed to operate concurrently with each other, and the response network and credit network are designed to be non-blocking.

Example B8. The reconfigurable processor of any of examples B3 through B7, wherein the target is the first health monitor register in the interface configurable unit and the reply includes both a first response packet sent over the response network and a first test response token sent over the request network, the network health monitor circuit configured to send nothing on the response network in response to receiving the first test response token.

Example B9. The reconfigurable processor of example B8, the network health monitor circuit further configured to: send a first read request to the first health monitor register over the request network; and wait up to the timeout period to receive first read data from the first health monitor register over the data network, compare the first read data to the first write data, and detect the network failure condition in response to the first read data being different than the first write data or not receiving the first read data within the timeout period.

Example B10. The reconfigurable processor of example B9, the network health monitor circuit further configured to, in response to the first read data being equal to the first write data: wait for a delay period after the first read data is received; send a second write request to the second health monitor register over the request network; send second write data to the second health monitor register over the data network; wait for up to the timeout period to receive a second response packet from the second external interface circuit over the response network, and in response to not receiving the second response packet during the timeout period, detect the network failure condition; send a second read request to the second health monitor register over the request network; and wait up to the timeout period to receive second read data from the second health monitor register over the data network, compare the second read data to the second write data, and detect the network failure condition in response to the second read data being different than the second write data or not receiving the second read data within the timeout period.

Example B11. The reconfigurable processor of example B10, the second external interface circuit configured to not send a second test response token over the request network in reply to the second write request.

Example B12. The reconfigurable processor of example B11, wherein the second external communication link comprises a memory interface and the external device comprises one or more memory devices.

Example B13. The reconfigurable processor of any of examples B10 through B11, the second external interface circuit configured to send a second test response token over the request network in reply to the second write request; and the network health monitor circuit further configured to wait for up to the timeout period to receive the second test response token from the second external interface circuit over the request network, and in response to not receiving the second test response token from the target during the timeout period, detect the network failure condition.

Example B14. The reconfigurable processor of any of examples B3 through B7, wherein the target is the second health monitor register in the second external interface circuit; and the second external interface circuit is further configured to, in response to receiving the first write request, including first metadata identifying the first health monitor register, over the request network and the first write data over the data network: forward to the first health monitor register, based on the first metadata, the first write request over the request network and the first write data over the data network; forward a first response packet received on the response network from the interface configurable unit to the network health monitor circuit on the response network; and forward a first test response token received on the request network from the interface configurable unit to the network health monitor circuit on the request network; wherein the network health monitor circuit is further configured to wait for up to the timeout period to receive both the first response packet on the response network and the first test response token over the request network from the second external interface circuit, and in response to not receiving both the first response packet and the first test response token during the timeout period, detect the network failure condition.

Example B15. The reconfigurable processor of example B14, the network health monitor circuit further configured to send a first read request to the second external interface circuit over the request network, and the second external interface circuit is further configured to, in response to receiving a first read request, including second metadata identifying the first health monitor register, over the request network: forward to the first health monitor register, based on the first metadata, the first read request over the request network; and forward first read data received on the data network from the interface configurable unit to the network health monitor circuit on the data network; wherein the network health monitor circuit is further configured to wait up to the timeout period to receive the first read data from the second external interface circuit over the data network, compare the first read data to the first write data, and detect the network failure condition in response to the first read data being different than the first write data or not receiving the first read data within the timeout period.

Example B16. The reconfigurable processor of any of examples B3 through B15, the first external interface circuit configurable to send an interrupt to a host computer through the first external communication link in response to detection of the network failure condition.

Example B17. The reconfigurable processor of any of examples B3 through B16, the first external interface circuit comprising the network health monitor circuit.

Example B18. The reconfigurable processor of any of examples B3 through B17, wherein the first external interface circuit sends a force quit message to the interface configurable unit over the internal network in response to detection of the network failure condition that causes the interface configurable unit to stop execution of an application running on the array of configurable units.

Example B19. The reconfigurable processor of example B18, the interface configurable unit further comprising a force-quit controller configurable to stop execution of an application running on the array of configurable units in response to receiving that force quit message.

Example B20. A method for detecting a malfunctioning network in a CGRP (a coarse-grained configurable processor) that includes a network health monitor circuit, an interface configurable unit in an array of configurable units, a first external interface circuit, and a second external interface circuit, all coupled to an internal network that includes a request network, a response network, and a data network, wherein a network protocol for the internal network includes a response packet sent over the response network in response to a write request sent over the request network, the method comprising: sending, from the network health monitor circuit to a target, a first write request over the request network and first write data to the target over the data network, wherein the target comprises a first health monitor register in the interface configurable unit or a second health monitor register in the second external interface circuit; and waiting for up to a timeout period to receive a reply from the target over the internal network at the network health monitor circuit, and in response to not receiving the reply from the target during the timeout period, detecting a network failure condition.

Example B21. The method of example B20, wherein the first write data includes a timestamp or sequence number.

Example B22. The method of any of examples B20 through B21, wherein the target is the first health monitor register in the interface configurable unit and the reply includes both a first response packet sent over the response network and a first test response token sent over the request network.

Example B23. The method of example B22, further comprising: sending a first read request to the target over the request network; waiting for up to the timeout period to receive first read data from the target over the data network; comparing the first read data to the first write data; and detecting the network failure condition in response to the first read data being different than the first write data or not receiving the first read data within the timeout period.

Example B24. The method of example B23, wherein the target is the first health monitor register, the method further comprising: waiting for a delay period after receiving the first read data; sending a second write request to the second health monitor register over the request network; sending second write data to the second health monitor register over the data network; waiting for up to the timeout period to receive a second response packet from the second external interface circuit over the response network, and in response to not receiving the second response packet during the timeout period, detecting the network failure condition; sending a second read request to the second health monitor register over the request network; and waiting up to the timeout period to receive second read data from the second health monitor register over the data network; comparing the second read data to the second write data; and detecting the network failure condition in response to the second read data being different than the second write data or not receiving the second read data within the timeout period.

Example B25. The method of any of examples B20 through B21, wherein the target is the second health monitor register in the second external interface circuit and the first write request includes first metadata identifying the first health monitor register, the method further comprising: the second external interface circuit is further configured to, in response to receiving the first write request, including, over the request network and the first write data over the data network: forwarding, from the second external interface circuit to the first health monitor register, based on the first metadata, the first write request over the request network and the first write data over the data network; forwarding a first response packet received on the response network from the interface configurable unit to the network health monitor circuit on the response network; forwarding a first test response token received on the request network from the interface configurable unit to the network health monitor circuit on the request network; waiting, by the network health monitor circuit, for up to the timeout period to receive both the first response packet on the response network and the first test response token over the request network from the second external interface circuit; and detecting the network failure condition in response to not receiving both the first response packet and the first test response token during the timeout period.

Example B26. The method of example B25, further comprising: sending a first read request, including second metadata identifying the first health monitor register, from the network health monitor circuit to the second external interface circuit over the request network; forwarding, based on the first metadata, the first read request over the request network from the second external interface circuit to the first health monitor register; forwarding, by the second external interface circuit, first read data received on the data network from the interface configurable unit to the network health monitor circuit over the data network; waiting, by the network health monitor circuit, up to the timeout period to receive the first read data from the second external interface circuit over the data network; comparing the first read data to the first write data; and detecting the network failure condition in response to the first read data being different than the first write data or not receiving the first read data at the network health monitor circuit within the timeout period.

Example B27. The method of any of examples B20 through B26, further comprising sending an interrupt to a host computer through the first external interface circuit in response to detection of the network failure condition.

Example B28. The method of any of examples B20 through B27, further comprising sending a force quit message to the interface configurable unit that causes the interface configurable unit to stop execution of an application running on the array of configurable units.

Example C1. A method for detecting a network failure in an internal network that is internal to an integrated circuit or multi-chip module and includes a request network used to request transactions on the internal network, a response network used to send responses to the transactions requested on the request network, a data network used to transmit data for the transactions requested on the request network, and a credit network used to transmit credit tokens that manage traffic on the internal network, the request network, the response network, the data network, and the credit network configured to operate concurrently as separate packet-switching networks and having a plurality of links connected by a plurality of switches, the method comprising: sending, a request packet over the request network from a first interface circuit to a second interface circuit, the request packet moving through one or more request switches of the plurality of switches; receive a response packet over the response network from the second interface circuit at the first interface circuit, the response packet moving through one or more response switches of the plurality of switches; transferring a data packet through the data network between the first interface circuit and the second interface circuit, the data packet moving through one or more data switches of the plurality of switches; transferring a credit packet through the credit network between the first interface circuit and the second interface circuit, the credit packet moving through one or more credit switches of the plurality of switches; exchanging hop credits between adjacent switches of the plurality of switches to manage a flow of packets through the adjacent switches; receiving a packet at an input of a switch of the plurality of switches, wherein the packet is the request packet, the response packet, the data packet, or the credit packet; storing the packet in a buffer in the switch; determining an output port of the switch for the packet based on a header of the packet; holding the packet in the buffer until enough hop credits are accumulated for the output port to accommodate the packet before sending the packet through the output port, wherein a number of credits accumulated for the output port are based on previously received hop credits; monitoring an amount of time that the packet is held in the buffer before it is sent on the output port; in response to the packet being held in the buffer for longer than a timeout period, sending a timeout message to a network recovery circuit; and setting a network failure condition in the network recovery circuit in response to receiving the timeout message.

Example C2. The method of example C1, further comprising sending the timeout message from the switch to the network recovery circuit over the response network.

Example C3. The method of any of examples C1 through C2, further comprising sending an interrupt to a host computer through an external communication link in response to the network failure condition being set.

Example C4. The method of any of examples C1 through C3, further comprising stopping execution of an application using the internal network in response to the network failure condition being set.

Example C5. A processor comprising: an internal network having a request network used to request transactions on the internal network, a response network used to send responses to the transactions requested on the request network, a data network used to transmit data for the transactions requested on the request network, and a credit network used to transmit credit tokens that manage traffic on the internal network, the request network, the response network, the data network, and the credit network configured to operate concurrently as separate packet-switching networks and having a plurality of links connected by a plurality of switches; a plurality of interface circuits coupled between the internal network and either a communication link or an electronic memory, the plurality of interface circuits configured to communicate with each other over the internal network; and a network recovery circuit coupled to the internal network; a switch of the plurality of switches comprising: a plurality of ports; a plurality of buffers associated with respective ports of the plurality of ports to store input packets received through input ports of the plurality of ports; routing circuitry coupled to the plurality of buffers and configured to send the input packets stored in the plurality of buffers to respective output ports of the plurality of ports based on their respective destinations; and a watchdog timer configured to determine that a packet of the input packets has been stored in the plurality of buffers for longer than a timeout period without being sent, and send a timeout message to the network recovery circuit in response; and the network recovery circuit configured to receive the timeout message and set a network failure condition in response.

Example C6. The processor of example C5, wherein the timeout message is sent over the response network.

Example C7. The processor of any of examples C5 through C6, further comprising a force-quit controller configurable to stop execution of an application on at least a portion of the processor in response to the network failure condition being set.

Example C8. The processor of any of examples C5 through C57, the plurality of interface circuits including a host interface circuit, coupled to an external communication link, configurable to send an interrupt to a host computer through the external communication link in response to the network failure condition being set.

Example C9. The processor of example C8, wherein the external communication link comprises a PCIe (Peripheral Component Interconnect Express) link or an Ethernet link.

Example C10. The processor of any of examples C5 through C9, wherein host interface circuit includes the network recovery circuit.

Example C11. The processor of any of examples C5 through C10, the plurality of interface circuits including an interface configurable unit, and a memory interface circuit, the processor further comprising: an array of configurable units including the interface configurable unit, a plurality of processing units, and a plurality of memory units coupled together by an array level network, wherein the interface configurable unit is configurable to enable communication of application data between a configurable unit in array of configurable units and an external electronic memory coupled to the memory interface circuit over the internal network.

Example C12. A computing system comprising: a plurality of external communication links including a first external communication link and a second external communication link; an external device coupled to the first external communication link; a host computer coupled to the second external communication link; and a CGRP (coarse-grained reconfigurable processor), coupled to both the first external communication link and the second external communication link, the CGRP comprising an internal network and a network recovery circuit coupled to the internal network, the internal network having a request network used to request transactions on the internal network, a response network used to send responses to the transactions requested on the request network, a data network used to transmit data for the transactions requested on the request network, and a credit network used to transmit credit tokens that manage traffic on the internal network, the request network, the response network, the data network, and the credit network configured to operate concurrently as separate packet-switching networks and having a plurality of links connected by a plurality of switches; a switch of the plurality of switches comprising: a plurality of ports; a plurality of buffers associated with respective ports of the plurality of ports to store input packets receive through the plurality of ports; routing circuitry coupled to the plurality of buffers configured to send the input packets stored in the plurality of buffers to respective ports of the plurality of ports based on their respective destinations; and a watchdog timer configured to determine that a packet of the input packets has been stored in the plurality of buffers for longer than a timeout period without being sent, and send a timeout message to the network recovery circuit in response; and the network recovery circuit configured to receive the timeout message and set a network failure condition in response.

Example C13. The computing system of example C12, wherein the timeout message is sent over the response network.

Example C14. The computing system of any of examples C12 through C13, the CGRP further comprising a force-quit controller configurable to stop execution of an application on at least a portion of the CGRP in response to the network failure condition being set.

Example C15. The computing system of any of examples C12 through C14, further comprising a plurality of interface circuits coupled to the internal network, the plurality of interface circuits configured to communicate with each other over the internal network; the plurality of interface circuits including a host interface circuit, coupled to the second external communication link, configurable to send an interrupt to the host computer through the second external communication link in response to the network failure condition being set.

Example C16. The computing system of example C15, wherein the second external communication link comprises a PCIe (Peripheral Component Interconnect Express) link or an Ethernet link.

Example C17. The computing system of any of examples C15 through C16, wherein the host interface circuit includes the network recovery circuit.

Example C18. The computing system of any of examples C15 through C17, the plurality of interface circuits including an interface configurable unit, and a memory interface circuit, the CGRP further comprising: an array of configurable units including the interface configurable unit, a plurality of processing units, and a plurality of memory units coupled together by an array level network, wherein the interface configurable unit is configurable to enable communication of application data between a configurable unit in array of configurable units and an external electronic memory coupled to the memory interface circuit over the internal network.

Example D1. A computing system comprising: a host computer; a first CGRP (coarse-grained reconfigurable architecture processor) coupled to the host computer through a first external communication link; a second CGRP coupled to the host computer through a second external communication link; the first CGRP and the second CGRP both respectively including: an internal network; a first external interface circuit coupled between the host computer and the internal network; a second external interface circuit coupled between a third external communication link and the internal network; a memory interface circuit coupled between an external memory and the internal network; a first array of configurable units and a second array of configurable units, each coupled to the internal network and respectively comprising a plurality of processor configurable units and a plurality of memory configurable units coupled together with an array-level network; a first hang detection circuit and a first force-quit controller associated with the first array of configurable units; a second hang detection circuit and a second force-quit controller associated with the second array of configurable units; and a network recovery circuit including one or more control registers that have a first application ID field associated with the first array of configurable units, a second application ID field associated with the second array of configurable units, a first hang syndrome field that indicate whether the first array of configurable units is hung. and a second hang syndrome field that indicate whether the second array of configurable units is hung; the host computer programmed to: send first configuration information for a first portion of a first application to the first array of configurable units in the first CGRP and set the first application ID field in the first CGRP to a value indicative of the first application; send second configuration information for a second portion of the first application to the first array of configurable units in the second CGRP; initiate execution of the first application using at least the first array of configurable units in both the first CGRP and the second CGRP; and in response to receiving an interrupt from the first CGRP to the host computer indicating that the first array of configurable units in the first CGRP is hung, send a command to the second CGRP to send a force quit message to the first force-quit controller to halt execution of the first application on the first array of configurable units in the second CGRP; and the network recovery circuit in the first CGRP, in response to receiving a hang message from the first hang detection circuit in the first CGRP over the internal network in the first CGRP, is configured to: send a first force-quit message to the first force-quit controller in the first CGRP to halt execution by the first array of configurable units in the first CGRP; set the first hang syndrome field to indicate that the first array of configurable units in the first CGRP is hung; send the interrupt to the host computer to indicate that the first array of configurable units in the first CGRP is hung; compare a first value of the first application ID field in the first CGRP to a second value of the second application ID field in the first CGRP; and send a second force-quit message to the second force-quit controller in the first CGRP to halt execution by the second array of configurable units in the first CGRP in response to the first value being equal to the second value.

Example D2. The computing system of example D1, wherein the second external interface circuit in the first CGRP, in response to receiving a packet over the third external communication link from the second CGRP that includes information indicating a destination agent on the internal network of the first CGRP for the packet, is configured to: in response to determining that the destination agent is associated with the first array of configurable units in the first CGRP and the first hang syndrome field in the first CGRP is not set, send the packet over the internal network in the first CGRP to the destination agent; in response determining that the destination agent is associated with the first array of configurable units in the first CGRP and the first hang syndrome field in the first CGRP is set, discard the packet; in response to determining that the destination agent is associated with the second array of configurable units in the first CGRP and that second hang syndrome field in the first CGRP is not set, send the packet over the internal network in the first CGRP to the destination agent; in response determining that the destination agent is associated with the second array of configurable units in the first CGRP and the second hang syndrome field in the first CGRP is set, discard the packet; and in response determining that the destination agent is the memory interface circuit in the first CGRP, send the packet over the internal network in the first CGRP to memory interface circuit in the first CGRP regardless of a state of the first hang syndrome field or a state of the second hang syndrome field.

Example D3. A reconfigurable processor, comprising: an internal network; a first array of configurable units and a second array of configurable units, each coupled to the internal network and respectively comprising a plurality of processor configurable units and a plurality of memory configurable units coupled together with an array-level network; a first hang detection circuit and a first force-quit controller associated with the first array of configurable units; a second hang detection circuit and a second force-quit controller associated with the second array of configurable units; and a network recovery circuit including one or more control registers that have a first application ID field associated with the first array of configurable units and a second application ID field associated with the second array of configurable units, the network recovery circuit configured to: receive a hang message from the first hang detection circuit over the internal network; send a first force-quit message to the first force-quit controller to halt execution by the first array of configurable units; compare a first value of the first application ID field to a second value of the second application ID field; and send a second force-quit message to the second force-quit controller to halt execution by the second array of configurable units in response to the first value being equal to the second value.

Example D4. The reconfigurable processor of example D3, further comprising a first external interface circuit coupled between the internal network and an external communication link, the first external interface circuit including one or more hang syndrome registers that indicate whether the first array of configurable units is hung and whether the second array of configurable units is hung, the network recovery circuit further configured to: set the one or more hang syndrome registers to indicate that the first array of configurable units is hung in conjunction with sending the first force-quit message; and set the one or more hang syndrome registers to indicate that the second array of configurable units is hung in conjunction with sending the second force-quit message.

Example D5. The reconfigurable processor of example D4, the first external interface circuit configured to: receive a packet over the external communication link that includes information indicating a destination agent on the internal network for the packet; in response to determining that the destination agent is associated with the first array of configurable units and that one or more hang syndrome registers does not indicate that the first array of configurable units is hung, send the packet over the internal network to the destination agent; in response to determining that the destination agent is associated with the first array of configurable units and that one or more hang syndrome registers indicates that the first array of configurable units is hung, discard the packet; in response to determining that the destination agent is associated with the second array of configurable units and that one or more hang syndrome registers does not indicate that the second array of configurable units is hung, send the packet over the internal network to the destination agent; and in response to determining that the destination agent is associated with the second array of configurable units and that one or more hang syndrome registers indicates that the second array of configurable units is hung, discard the packet.

Example D6. The reconfigurable processor of any of example D4 through D5, the network recovery circuit further configured to detect whether the internal network is hung and to generate a network failure condition in response, the first external interface circuit configured to set the one or more hang syndrome registers to indicate that both the first array of configurable units and the second array of configurable units are hung in response to the network failure condition.

Example D7. The reconfigurable processor of example D3, further comprising: a first external interface circuit coupled between the internal network and an external communication link, the first external interface circuit including one or more hang syndrome registers including a first bit field to indicate whether the first array of configurable units has been sent a force-quit message, a second bit field to indicate whether the second array of configurable units has been sent a force-quit message, and a third bit field to indicate that a network failure condition has been detected; and a network health monitor circuit to detect whether the internal network is hung and to generate the network failure condition in response; the network recovery circuit further configured to set the first bit field in conjunction with sending the first force-quit message, set the second bit field in conjunction with sending the second force-quit message, and set the third bit field in response to the network failure condition; the first external interface circuit configured to: receive a packet over the first external interface circuit that includes information indicating a destination agent on the internal network for the packet; in response to determining that the destination agent is associated with the first array of configurable units and neither the first bit field nor the third bit field are set, send the packet over the internal network to the destination agent; in response determining that the destination agent is associated with the first array of configurable units and either the first bit field or the third bit field are set, discard the packet; in response to determining that the destination agent is associated with the second array of configurable units and neither the second bit field nor the third bit field are set, send the packet over the internal network to the destination agent; and in response determining that the destination agent is associated with the second array of configurable units and either the second bit field or the third bit field are set, discard the packet.

Example D8. The reconfigurable processor of any of example D3 through D7, wherein the first force-quit controller also empties buffers in the first array of configurable units related to the internal network and allows any outstanding transactions involving the first array of configurable units to complete in response to receiving the first force-quit message.

Example D9. A method of halting execution of an application within a reconfigurable processor having a first array of configurable units and a second array of configurable units, each coupled to an internal network of the reconfigurable processor and respectively comprising a plurality of processor configurable units and a plurality of memory configurable units coupled together with an array-level network, the reconfigurable processor including one or more CSRs (control/status registers) that include a first application ID field and a second application ID field, the method comprising: receiving, at a network recovery circuit in the reconfigurable processor, a hang message from a first hang detection circuit associated with the first array of configurable units of the reconfigurable processor; sending, by the network recovery circuit, a first force-quit message to a first force-quit controller associated with the first array of configurable units in response to receiving the hang message; halting, by the first force-quit controller, execution of a first application running on the first array of configurable units in response to receiving the first force-quit message; comparing a first value of the first application ID field to a second value of the second application ID field; sending, by the network recovery circuit, a second force-quit message to a second force-quit controller associated with the second array of configurable units in response to the first value being equal to the second value, which signifies that both the first array of configurable units and the second array of configurable units are assigned to the first application; and halting, by the second force-quit controller, execution of the first application running on the second array of configurable units in response to receiving the second force-quit message.

Example D10. The method of example D9, further comprising: sending first configuration information for a first portion of a first application from a host computer to the first array of configurable units in the reconfigurable processor and set the first application ID field in the reconfigurable processor to a value indicative of the first application; send second configuration information for a second portion of the first application from the host computer to the second array of configurable units in the reconfigurable processor and set the second application ID field in the reconfigurable processor to the value indicative of the first application; and initiate, from the host computer, execution of the first application using at least the first array of configurable units and the second array of configurable units in the reconfigurable processor.

Example D11. The method of example D10, wherein the reconfigurable processor is a first reconfigurable processor, the method further comprising: send third configuration information for a third portion of the first application from the host computer to a first array of configurable units in a second reconfigurable processor and set a first application ID field in the second reconfigurable processor to the value indicative of the first application; send fourth configuration information for a portion of a second application from the host computer to a second array of configurable units in the second reconfigurable processor and set a second application ID field in the second reconfigurable processor to a value indicative of the second application; initiate, from the host computer, execution of the first application using the first array of configurable units in the second reconfigurable processor and execution of the second application using the second array of configurable units in the second reconfigurable processor; send an interrupt from the first reconfigurable processor to the host computer to indicate that the first array of configurable units in the first reconfigurable processor is hung; in response to receiving the interrupt from the first reconfigurable processor, determining, by the host computer, one or more other arrays of configurable units that are assigned to the first application, including the first array of configurable units in the second reconfigurable processor; send a command to the second reconfigurable processor to send a force-quit message to a first force-quit controller associated with the first array of configurable units in the second reconfigurable processor; and halting, by the first force-quit controller in the second reconfigurable processor, execution of the first application running on the first array of configurable units the second reconfigurable processor.

Example D12. The method of any of example D9 through D11, further comprising receiving the hang message at the network recovery circuit from the first hang detection circuit over the internal network.

Example D13. The method of any of example D9 through D12, further comprising allowing a second application to continue execution on the second array of configurable units in response to the first value being different than the second value, which signifies that the first array of configurable units and the second array of configurable units are assigned to different applications, wherein the second application continues to execute on the second array of configurable units concurrently with the halting of the execution of the first application on the first array of configurable units.

Example D14. The method of any of example D9 through D13, the reconfigurable processor including an external interface circuit coupled between the internal network and an external communication link, the method further comprising: setting a first hang syndrome field in the one or more CSRs to indicate that the first array of configurable units is hung in conjunction with sending the first force-quit message; setting a second hang syndrome field in the one or more CSRs to indicate that the second array of configurable units is hung in conjunction with sending the second force-quit message; receiving a packet over the external communication link at the external interface circuit, the packet including information indicating a destination agent on the internal network for the packet; sending the packet over the internal network to the destination agent in response to determining that either: the destination agent is associated with the first array of configurable units and that first hang syndrome field does not indicate that the first array of configurable units is hung, or the destination agent is associated with the second array of configurable units and that second hang syndrome field does not indicate that the second array of configurable units is hung; and discarding the packet in response to determining that either: the destination agent is associated with the first array of configurable units and that first hang syndrome field indicates that the first array of configurable units is hung, or the destination agent is associated with the second array of configurable units and that second hang syndrome field indicates that the second array of configurable units is hung.

Example D15. The method of example D14, further comprising: detecting that the internal network is hung; and setting both a first hang syndrome field and the second hang syndrome field in the one or more CSRs.

Example D16. The method of example D9, the reconfigurable processor including an external interface circuit coupled between the internal network and an external communication link, the method further comprising: setting a first hang syndrome field in the one or more CSRs to indicate that the first array of configurable units is hung in conjunction with sending the first force-quit message; setting a second hang syndrome field in the one or more CSRs to indicate that the second array of configurable units is hung in conjunction with sending the second force-quit message; detecting that the internal network is hung and setting a third hang syndrome field in the one or more CSRs to indicated that the internal network is hung in response; receiving a packet over the external communication link at the external interface circuit, the packet including information indicating a destination agent on the internal network for the packet; sending the packet over the internal network to the destination agent in response to determining that either: the destination agent is associated with the first array of configurable units and that neither the first hang syndrome field nor the third hang syndrome field is set, or the destination agent is associated with the second array of configurable units and that neither the second hang syndrome field nor the third hang syndrome field is set; and discarding the packet in response determining that either: the destination agent is associated with the first array of configurable units and that either the first hang syndrome field or the third hang syndrome field is set, or the destination agent is associated with the second array of configurable units and that either the second hang syndrome field does or the third hang syndrome field is set.

Example D17. The method of any of example D9 through D16, further comprising emptying buffers in the first array of configurable units related to the internal network to allow any outstanding transactions involving the first array of configurable units to complete in response to the first force-quit controller receiving the first force-quit message.

Example D18. The method of example D9, the reconfigurable processor including an external interface circuit coupled between the internal network and an external communication link, the method further comprising: sending first configuration information for a first portion of the first application from a host computer through the external communication link, the external interface circuit, and the internal network, to the first array of configurable units; setting the first application ID field to a value indicative of the first application in response to a command sent from the host computer; sending second configuration information for a second portion of the first application from the host computer through the external communication link, the external interface circuit, and the internal network, to the second array of configurable units; setting the second application ID field to a value indicative of the first application in response to a command sent from the host computer; and executing the first application using at least both the first array of configurable units and the second array of configurable units.

Example D19. The method of example D9, the reconfigurable processor including an external interface circuit coupled between the internal network and an external communication link, the method further comprising: sending first configuration information for at least a portion of the first application from a host computer through the external communication link, the external interface circuit, and the internal network, to the first array of configurable units; setting the first application ID field to a value indicative of the first application in response to a command sent from the host computer; sending second configuration information for at least a portion of a second application from the host computer through the external communication link, the external interface circuit, and the internal network, to the second array of configurable units; setting the second application ID field to a value indicative of the second application in response to a command sent from the host computer; executing the first application using at least the first array of configurable units; and executing the second application using at least the second array of configurable units.

Example D20. The method of example D9, the reconfigurable processor including an external interface circuit coupled between the internal network and an external communication link, the method further comprising: sending first configuration information for a first portion of the first application from a host computer through the external communication link, the external interface circuit, and the internal network, to the first array of configurable units; setting the first application ID field to a value indicative of the first application in response to a command sent from the host computer; sending second configuration information for a second portion of the first application from the host computer to a third array of configurable units in another reconfigurable processor; executing the first application using at least both the first array of configurable units and the third array of configurable units; sending an interrupt from the reconfigurable processor to the host computer in response to receiving the hang message; and halting, by the host computer, execution of the first application running on the third array of configurable units in response to receiving the interrupt.

Considerations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods, and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a System-on-Chip (SoC), application-specific integrated circuit (ASIC), programmable processor, in a programmable logic device such as a field-programmable gate array (FPGA), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope as set forth. Therefore, many modifications may be made to adapt a particular situation or material to the essential scope of the technology disclosed.

The invention claimed is:

1. A computing system comprising:

a host computer;

a first CGRP (coarse-grained reconfigurable architecture processor) coupled to the host computer through a first external communication link;

a second CGRP coupled to the host computer through a second external communication link;

the first CGRP and the second CGRP both respectively including:

an internal network;

a first external interface circuit coupled between the host computer and the internal network;

a second external interface circuit coupled between a third external communication link and the internal network;

a memory interface circuit coupled between an external memory and the internal network;

a first array of configurable units and a second array of configurable units, each coupled to the internal network and respectively comprising a plurality of processor configurable units and a plurality of memory configurable units coupled together with an array-level network;

a first hang detection circuit and a first force-quit controller associated with the first array of configurable units;

a second hang detection circuit and a second force-quit controller associated with the second array of configurable units; and a network recovery circuit including one or more control registers that have a first application ID field associated with the first array of configurable units, a second application ID field associated with the second array of configurable units, a first hang syndrome field that indicate whether the first array of configurable units is hung, and a second hang syndrome field that indicate whether the second array of configurable units is hung;

the host computer programmed to:

send first configuration information for a first portion of a first application to the first array of configurable units in the first CGRP and set the first application ID field in the first CGRP to a value indicative of the first application;

send second configuration information for a second portion of the first application to the first array of configurable units in the second CGRP;

initiate execution of the first application using at least the first array of configurable units in both the first CGRP and the second CGRP; and in response to receiving an interrupt from the first CGRP to the host computer indicating that the first array of configurable units in the first CGRP is hung, send a command to the second CGRP to send a force quit message to the first force-quit controller to halt execution of the first application on the first array of configurable units in the second CGRP; and the network recovery circuit in the first CGRP, in response to receiving a hang message from the first hang detection circuit in the first CGRP over the internal network in the first CGRP, is configured to:

send a first force-quit message to the first force-quit controller in the first CGRP to halt execution by the first array of configurable units in the first CGRP;

set the first hang syndrome field to indicate that the first array of configurable units in the first CGRP is hung;

send the interrupt to the host computer to indicate that the first array of configurable units in the first CGRP is hung;

compare a first value of the first application ID field in the first CGRP to a second value of the second application ID field in the first CGRP; and send a second force-quit message to the second force-quit controller in the first CGRP to halt execution by the second array of configurable units in the first CGRP in response to the first value being equal to the second value.

2. The computing system of claim 1, wherein the second external interface circuit in the first CGRP, in response to receiving a packet over the third external communication link from the second CGRP that includes information indicating a destination agent on the internal network of the first CGRP for the packet, is configured to:

in response to determining that the destination agent is associated with the first array of configurable units in the first CGRP and the first hang syndrome field in the first CGRP is not set, send the packet over the internal network in the first CGRP to the destination agent;

in response determining that the destination agent is associated with the first array of configurable units in the first CGRP and the first hang syndrome field in the first CGRP is set, discard the packet;

in response to determining that the destination agent is associated with the second array of configurable units in the first CGRP and that the second hang syndrome field in the first CGRP is not set, send the packet over the internal network in the first CGRP to the destination agent;

in response determining that the destination agent is associated with the second array of configurable units in the first CGRP and the second hang syndrome field in the first CGRP is set, discard the packet; and in response determining that the destination agent is the memory interface circuit in the first CGRP, send the packet over the internal network in the first CGRP to memory interface circuit in the first CGRP regardless of a state of the first hang syndrome field or a state of the second hang syndrome field.

3. A reconfigurable processor, comprising:

an internal network;

a first array of configurable units and a second array of configurable units, each coupled to the internal network and respectively comprising a plurality of processor configurable units and a plurality of memory configurable units coupled together with an array-level network;

a first hang detection circuit and a first force-quit controller associated with the first array of configurable units;

a second hang detection circuit and a second force-quit controller associated with the second array of configurable units; and a network recovery circuit including one or more control registers that have a first application ID field associated with the first array of configurable units and a second application ID field associated with the second array of configurable units, the network recovery circuit configured to:

receive a hang message from the first hang detection circuit over the internal network;

send a first force-quit message to the first force-quit controller to halt execution by the first array of configurable units;

compare a first value of the first application ID field to a second value of the second application ID field; and send a second force-quit message to the second force-quit controller to halt execution by the second array of configurable units in response to the first value being equal to the second value.

4. The reconfigurable processor of claim 3, further comprising a first external interface circuit coupled between the internal network and an external communication link, the first external interface circuit including one or more hang syndrome registers that indicate whether the first array of configurable units is hung and whether the second array of configurable units is hung, the network recovery circuit further configured to:

set the one or more hang syndrome registers to indicate that the first array of configurable units is hung in conjunction with sending the first force-quit message; and set the one or more hang syndrome registers to indicate that the second array of configurable units is hung in conjunction with sending the second force-quit message.

5. The reconfigurable processor of claim 4, wherein the first external interface circuit configured to:

receive a packet over the external communication link that includes information indicating a destination agent on the internal network for the packet;

in response to determining that the destination agent is associated with the first array of configurable units and that one or more hang syndrome registers does not indicate that the first array of configurable units is hung, send the packet over the internal network to the destination agent;

in response to determining that the destination agent is associated with the first array of configurable units and that one or more hang syndrome registers indicates that the first array of configurable units is hung, discard the packet;

in response to determining that the destination agent is associated with the second array of configurable units and that one or more hang syndrome registers does not indicate that the second array of configurable units is hung, send the packet over the internal network to the destination agent; and in response to determining that the destination agent is associated with the second array of configurable units and that one or more hang syndrome registers indicates that the second array of configurable units is hung, discard the packet.

6. The reconfigurable processor of claim 4, wherein the network recovery circuit further configured to detect whether the internal network is hung and to generate a network failure condition in response, and wherein the first external interface circuit configured to set the one or more hang syndrome registers to indicate that both the first array of configurable units and the second array of configurable units are hung in response to the network failure condition.

7. The reconfigurable processor of claim 3, further comprising:

a first external interface circuit coupled between the internal network and an external communication link, the first external interface circuit including one or more hang syndrome registers including a first bit field to indicate whether the first array of configurable units has been sent a force-quit message, a second bit field to indicate whether the second array of configurable units has been sent a force-quit message, and a third bit field to indicate that a network failure condition has been detected; and a network health monitor circuit to detect whether the internal network is hung and to generate the network failure condition in response;

the network recovery circuit further configured to set the first bit field in conjunction with sending the first force-quit message, set the second bit field in conjunction with sending the second force-quit message, and set the third bit field in response to the network failure condition;

the first external interface circuit configured to:

receive a packet over the first external interface circuit that includes information indicating a destination agent on the internal network for the packet;

in response to determining that the destination agent is associated with the first array of configurable units and neither the first bit field nor the third bit field are set, send the packet over the internal network to the destination agent;

in response determining that the destination agent is associated with the first array of configurable units and either the first bit field or the third bit field are set, discard the packet;

in response to determining that the destination agent is associated with the second array of configurable units and neither the second bit field nor the third bit field are set, send the packet over the internal network to the destination agent; and in response determining that the destination agent is associated with the second array of configurable units and either the second bit field or the third bit field are set, discard the packet.

8. The reconfigurable processor of claim 3, wherein the first force-quit controller also empties buffers in the first array of configurable units related to the internal network and allows any outstanding transactions involving the first array of configurable units to complete in response to receiving the first force-quit message.

9. A method of halting execution of an application within a reconfigurable processor having a first array of configurable units and a second array of configurable units, each coupled to an internal network of the reconfigurable processor and respectively comprising a plurality of processor configurable units and a plurality of memory configurable units coupled together with an array-level network, the reconfigurable processor including one or more CSRs (control/status registers) that include a first application ID field and a second application ID field, the method comprising:

receiving, at a network recovery circuit in the reconfigurable processor, a hang message from a first hang detection circuit associated with the first array of configurable units of the reconfigurable processor;

sending, by the network recovery circuit, a first force-quit message to a first force-quit controller associated with the first array of configurable units in response to receiving the hang message;

halting, by the first force-quit controller, execution of a first application running on the first array of configurable units in response to receiving the first force-quit message;

comparing a first value of the first application ID field to a second value of the second application ID field;

sending, by the network recovery circuit, a second force-quit message to a second force-quit controller associated with the second array of configurable units in response to the first value being equal to the second value, which signifies that both the first array of configurable units and the second array of configurable units are assigned to the first application; and halting, by the second force-quit controller, execution of the first application running on the second array of configurable units in response to receiving the second force-quit message.

10. The method of claim 9, further comprising:

sending first configuration information for a first portion of the first application from a host computer to the first array of configurable units in the reconfigurable processor and set the first application ID field in the reconfigurable processor to a value indicative of the first application;

send second configuration information for a second portion of the first application from the host computer to the second array of configurable units in the reconfigurable processor and set the second application ID field in the reconfigurable processor to the value indicative of the first application; and initiate, from the host computer, execution of the first application using at least the first array of configurable units and the second array of configurable units in the reconfigurable processor.

11. The method of claim 10, wherein the reconfigurable processor is a first reconfigurable processor, the method further comprising:

send third configuration information for a third portion of the first application from the host computer to a third array of configurable units in a second reconfigurable processor and set a first application ID field in the second reconfigurable processor to the value indicative of the first application;

send fourth configuration information for a portion of a second application from the host computer to a fourth array of configurable units in the second reconfigurable processor and set a second application ID field in the second reconfigurable processor to a value indicative of the second application;

initiate, from the host computer, execution of the first application using the third array of configurable units in the second reconfigurable processor and execution of the second application using the fourth array of configurable units in the second reconfigurable processor;

send an interrupt from the first reconfigurable processor to the host computer to indicate that the first array of configurable units in the first reconfigurable processor is hung;

in response to receiving the interrupt from the first reconfigurable processor, determining, by the host computer, one or more other arrays of configurable units that are assigned to the first application, including the third array of configurable units in the second reconfigurable processor;

send a command to the second reconfigurable processor to send a force-quit message to a third force-quit controller associated with the third array of configurable units in the second reconfigurable processor; and halting, by the third force-quit controller in the second reconfigurable processor, execution of the first application running on the third array of configurable units the second reconfigurable processor.

12. The method of claim 9, further comprising receiving the hang message at the network recovery circuit from the first hang detection circuit over the internal network.

13. The method of claim 9, further comprising allowing a second application to continue execution on the second array of configurable units in response to the first value being different than the second value, which signifies that the first array of configurable units and the second array of configurable units are assigned to different applications, wherein the second application continues to execute on the second array of configurable units concurrently with the halting of the execution of the first application on the first array of configurable units.

14. The method of claim 9, wherein the reconfigurable processor including an external interface circuit coupled between the internal network and an external communication link, the method further comprising:

setting a first hang syndrome field in the one or more CSRs to indicate that the first array of configurable units is hung in conjunction with sending the first force-quit message;

setting a second hang syndrome field in the one or more CSRs to indicate that the second array of configurable units is hung in conjunction with sending the second force-quit message;

receiving a packet over the external communication link at the external interface circuit, the packet including information indicating a destination agent on the internal network for the packet;

sending the packet over the internal network to the destination agent in response to determining that either:

the destination agent is associated with the first array of configurable units and that the first hang syndrome field does not indicate that the first array of configurable units is hung, or the destination agent is associated with the second array of configurable units and that the second hang syndrome field does not indicate that the second array of configurable units is hung; and discarding the packet in response to determining that either:

the destination agent is associated with the first array of configurable units and that the first hang syndrome field indicates that the first array of configurable units is hung, or the destination agent is associated with the second array of configurable units and that the second hang syndrome field indicates that the second array of configurable units is hung.

15. The method of claim 14, further comprising:

detecting that the internal network is hung; and setting both a first hang syndrome field and the second hang syndrome field in the one or more CSRs.

16. The method of claim 9, wherein the reconfigurable processor including an external interface circuit coupled between the internal network and an external communication link, the method further comprising:

setting a first hang syndrome field in the one or more CSRs to indicate that the first array of configurable units is hung in conjunction with sending the first force-quit message;

setting a second hang syndrome field in the one or more CSRs to indicate that the second array of configurable units is hung in conjunction with sending the second force-quit message;

detecting that the internal network is hung and setting a third hang syndrome field in the one or more CSRs to indicated that the internal network is hung in response;

receiving a packet over the external communication link at the external interface circuit, the packet including information indicating a destination agent on the internal network for the packet;

sending the packet over the internal network to the destination agent in response to determining that either:

the destination agent is associated with the first array of configurable units and that neither the first hang syndrome field nor the third hang syndrome field is set, or the destination agent is associated with the second array of configurable units and that neither the second hang syndrome field nor the third hang syndrome field is set; and discarding the packet in response determining that either:

the destination agent is associated with the first array of configurable units and that either the first hang syndrome field or the third hang syndrome field is set, or the destination agent is associated with the second array of configurable units and that either the second hang syndrome field does or the third hang syndrome field is set.

17. The method of claim 9, further comprising emptying buffers in the first array of configurable units related to the internal network to allow any outstanding transactions involving the first array of configurable units to complete in response to the first force-quit controller receiving the first force-quit message.

18. The method of claim 9, wherein the reconfigurable processor including an external interface circuit coupled between the internal network and an external communication link, the method further comprising:

sending first configuration information for a first portion of the first application from a host computer through the external communication link, the external interface circuit, and the internal network, to the first array of configurable units;

setting the first application ID field to a value indicative of the first application in response to a command sent from the host computer;

sending second configuration information for a second portion of the first application from the host computer through the external communication link, the external interface circuit, and the internal network, to the second array of configurable units;

setting the second application ID field to a value indicative of the first application in response to a command sent from the host computer; and executing the first application using at least both the first array of configurable units and the second array of configurable units.

19. The method of claim 9, wherein the reconfigurable processor including an external interface circuit coupled between the internal network and an external communication link, the method further comprising:

sending first configuration information for at least a portion of the first application from a host computer through the external communication link, the external interface circuit, and the internal network, to the first array of configurable units;

setting the first application ID field to a value indicative of the first application in response to a command sent from the host computer;

sending second configuration information for at least a portion of a second application from the host computer through the external communication link, the external interface circuit, and the internal network, to the second array of configurable units;

setting the second application ID field to a value indicative of the second application in response to a command sent from the host computer;

executing the first application using at least the first array of configurable units; and executing the second application using at least the second array of configurable units.

20. The method of claim 9, wherein the reconfigurable processor including an external interface circuit coupled between the internal network and an external communication link, the method further comprising:

sending first configuration information for a first portion of the first application from a host computer through the external communication link, the external interface circuit, and the internal network, to the first array of configurable units;

setting the first application ID field to a value indicative of the first application in response to a command sent from the host computer;

sending second configuration information for a second portion of the first application from the host computer to a third array of configurable units in another reconfigurable processor;

executing the first application using at least both the first array of configurable units and the third array of configurable units;

sending an interrupt from the reconfigurable processor to the host computer in response to receiving the hang message; and halting, by the host computer, execution of the first application running on the third array of configurable units in response to receiving the interrupt.

* * * * *